No. 882,160. PATENTED MAR. 17, 1908.
D. L. NEWCOMB.
VOTE REGISTERING MACHINE.
APPLICATION FILED JUNE 17, 1903.
15 SHEETS—SHEET 1.
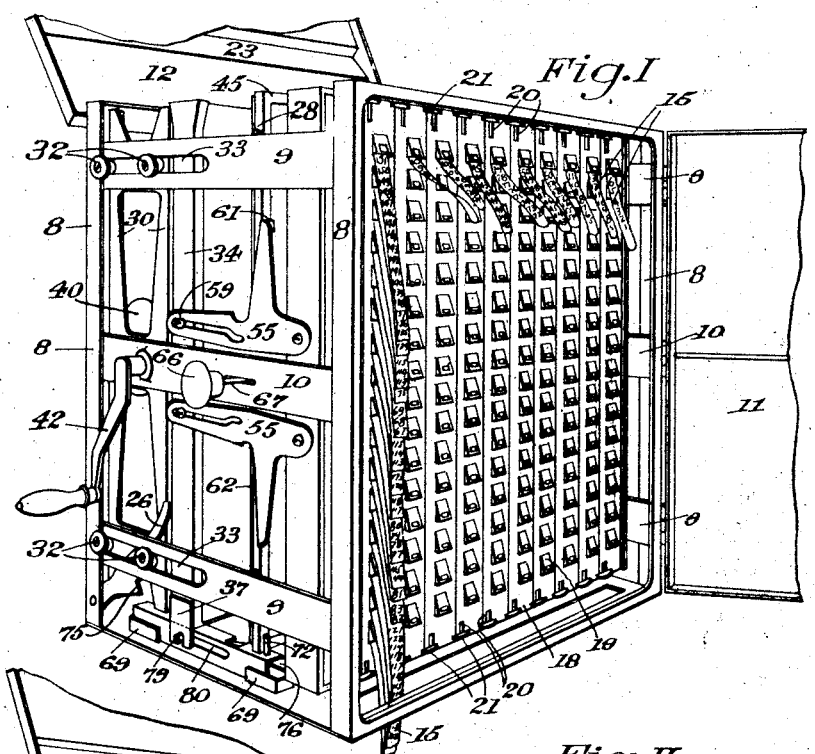
Fig. I.
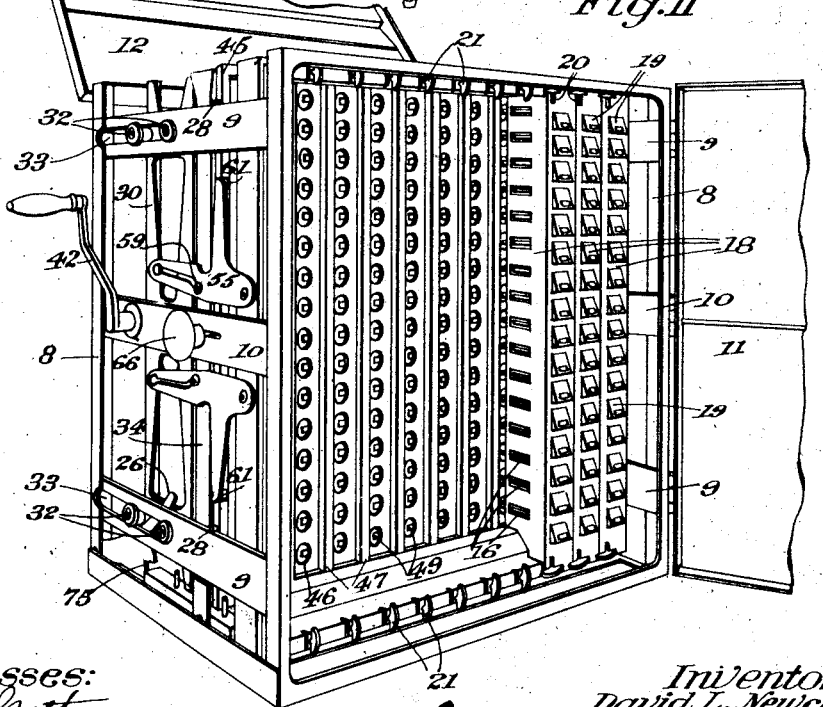
Fig. II.
Witnesses:
Geo. L. Goth
G. T. Hackley
Inventor
David L. Newcomb
by Townsend Bros.
his attys.

No. 882,160. PATENTED MAR. 17, 1908.
D. L. NEWCOMB.
VOTE REGISTERING MACHINE.
APPLICATION FILED JUNE 17, 1903.
15 SHEETS—SHEET 2.
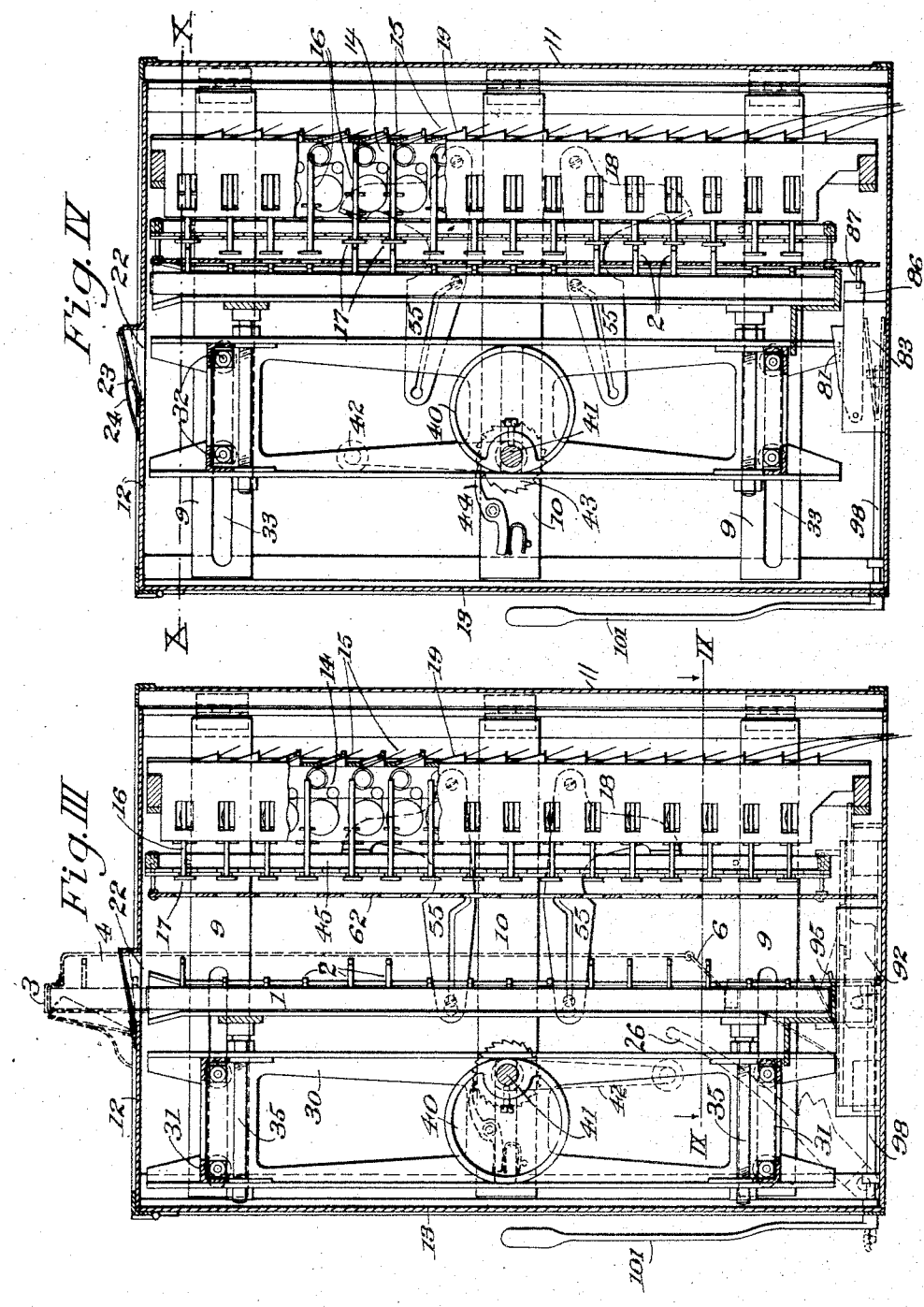
Witnesses:
Geo. L. Goetz
G. T. Hackler
Inventor
David L. Newcomb
by Townsend Bros.
his attys.

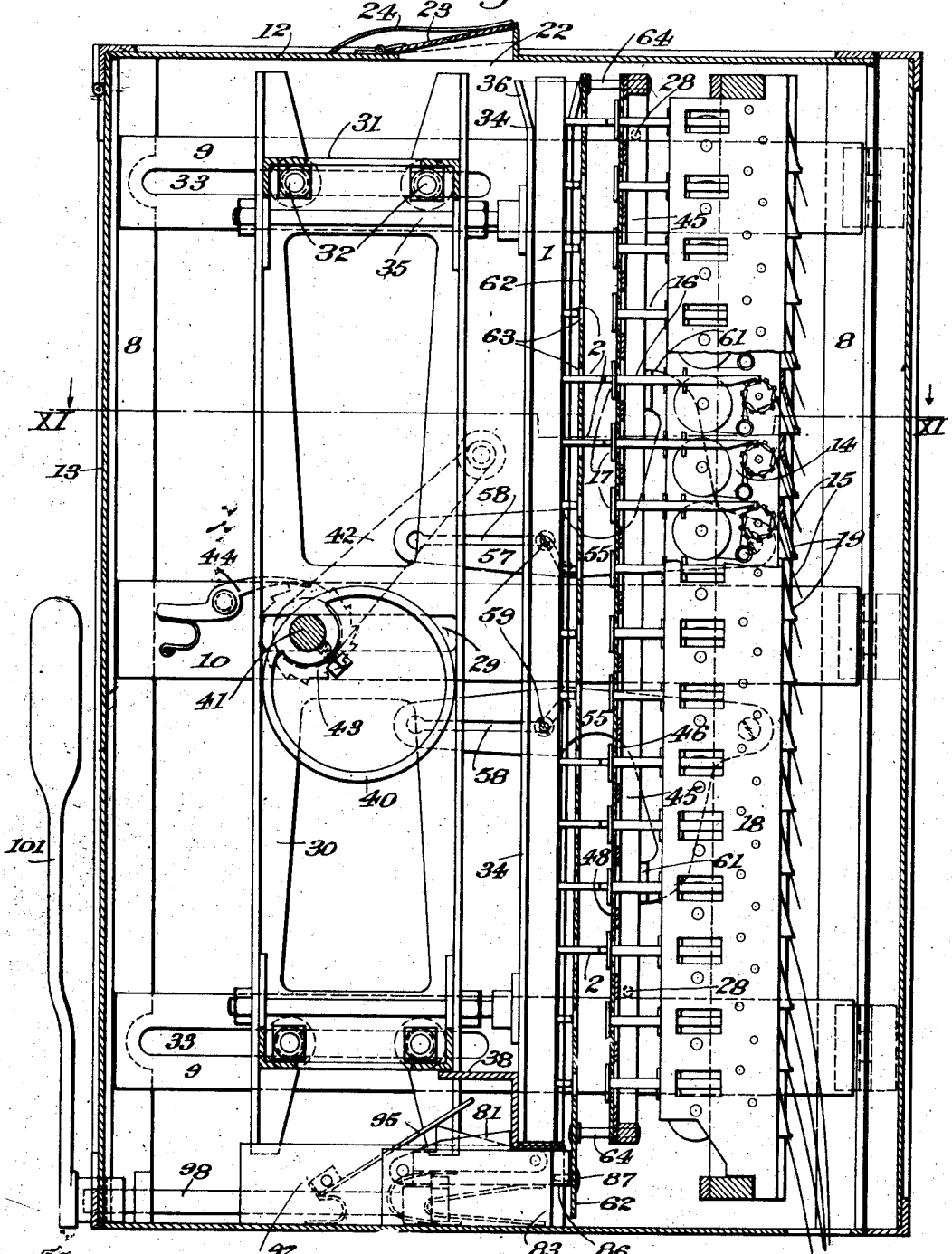

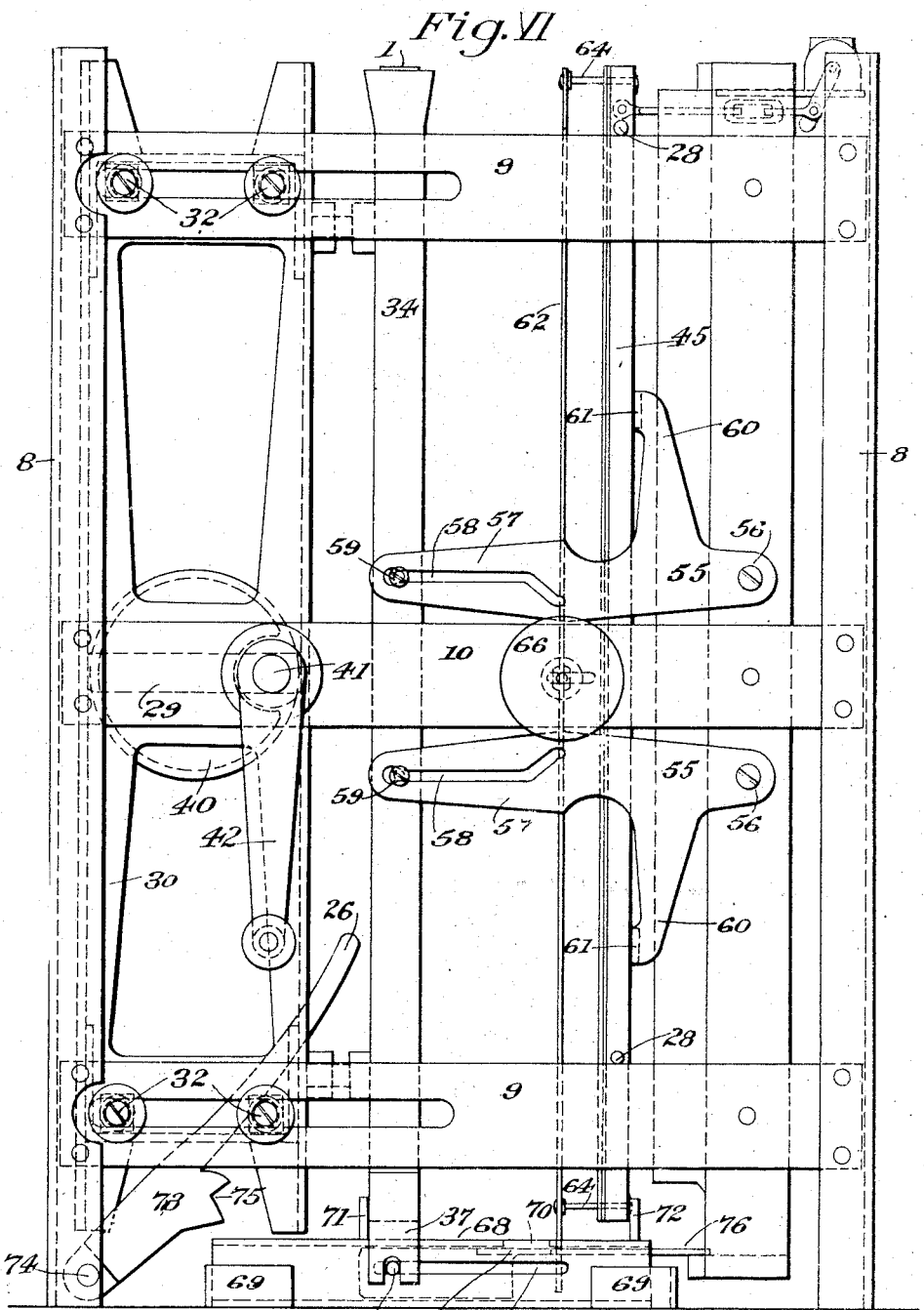

No. 882,160.  
PATENTED MAR. 17, 1908.  
D. L. NEWCOMB.  
VOTE REGISTERING MACHINE.  
APPLICATION FILED JUNE 17, 1903.  
15 SHEETS—SHEET 5.
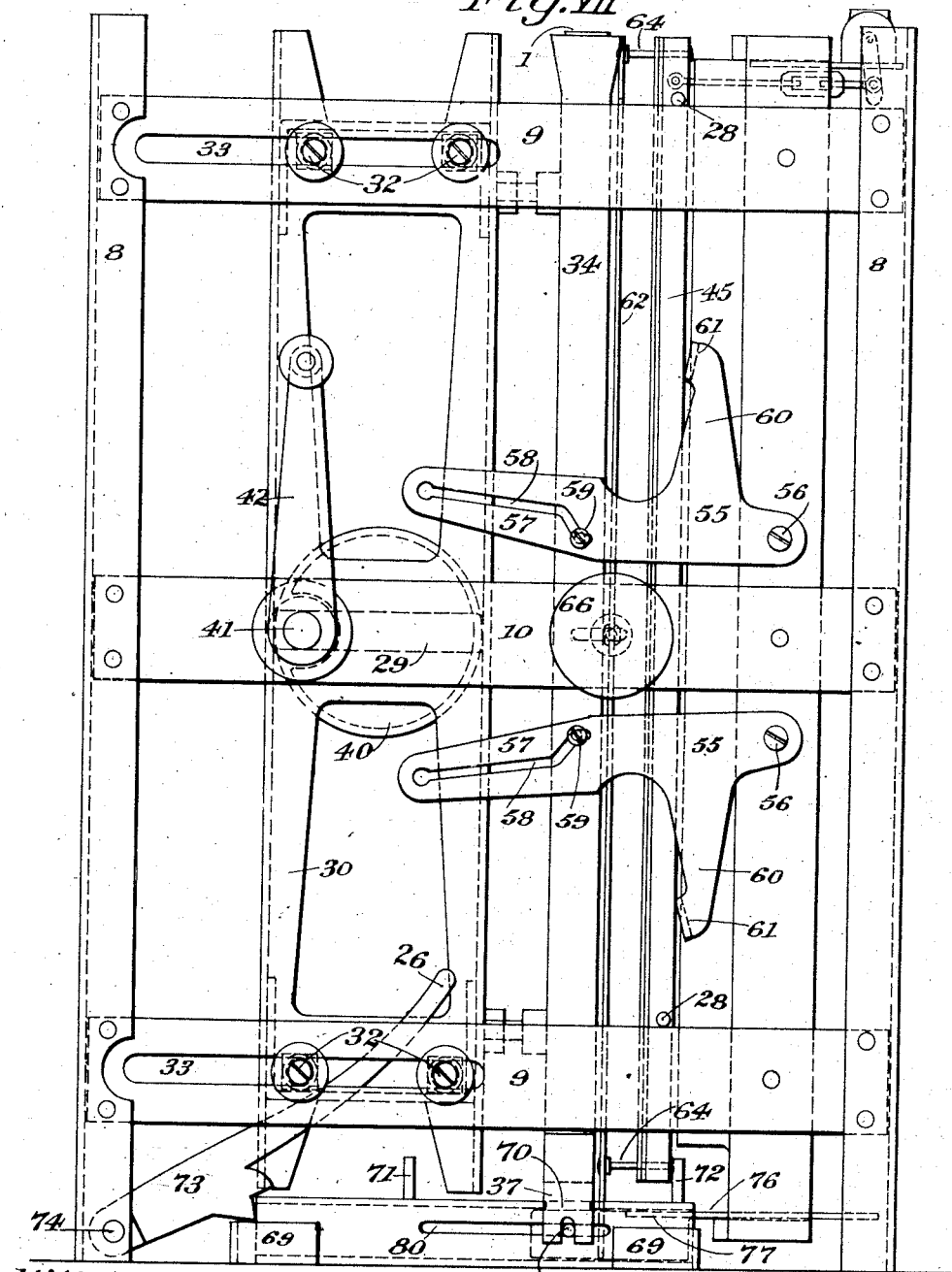
Fig. VII
Witnesses:  
Geo. L. Goetz  
G. T. Hackley
Inventor  
David L. Newcomb  
by Townsend Bro.  
his attys

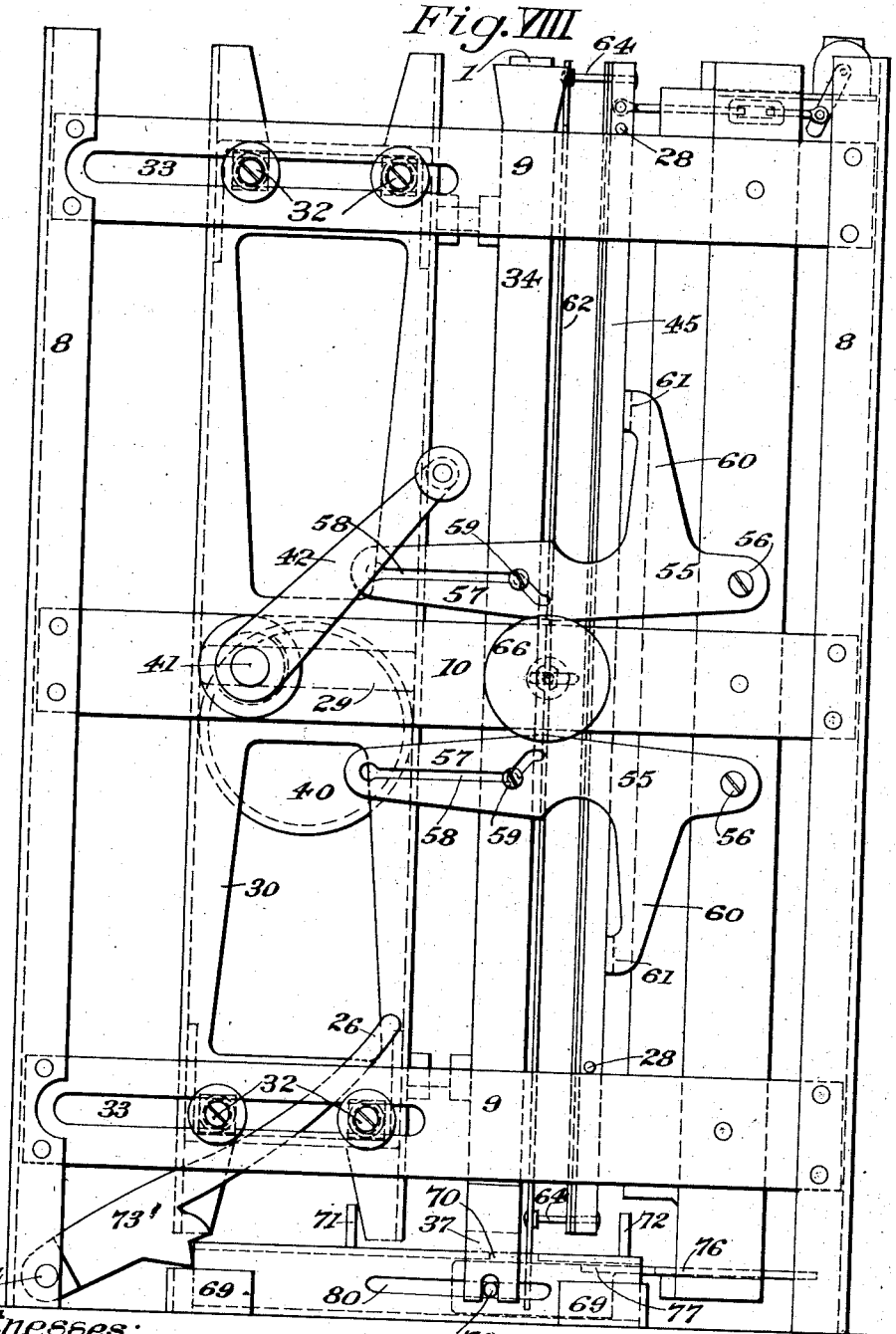

No. 882,160.  
D. L. NEWCOMB.  
VOTE REGISTERING MACHINE.  
APPLICATION FILED JUNE 17, 1903.  
PATENTED MAR. 17, 1908.  
15 SHEETS—SHEET 7.
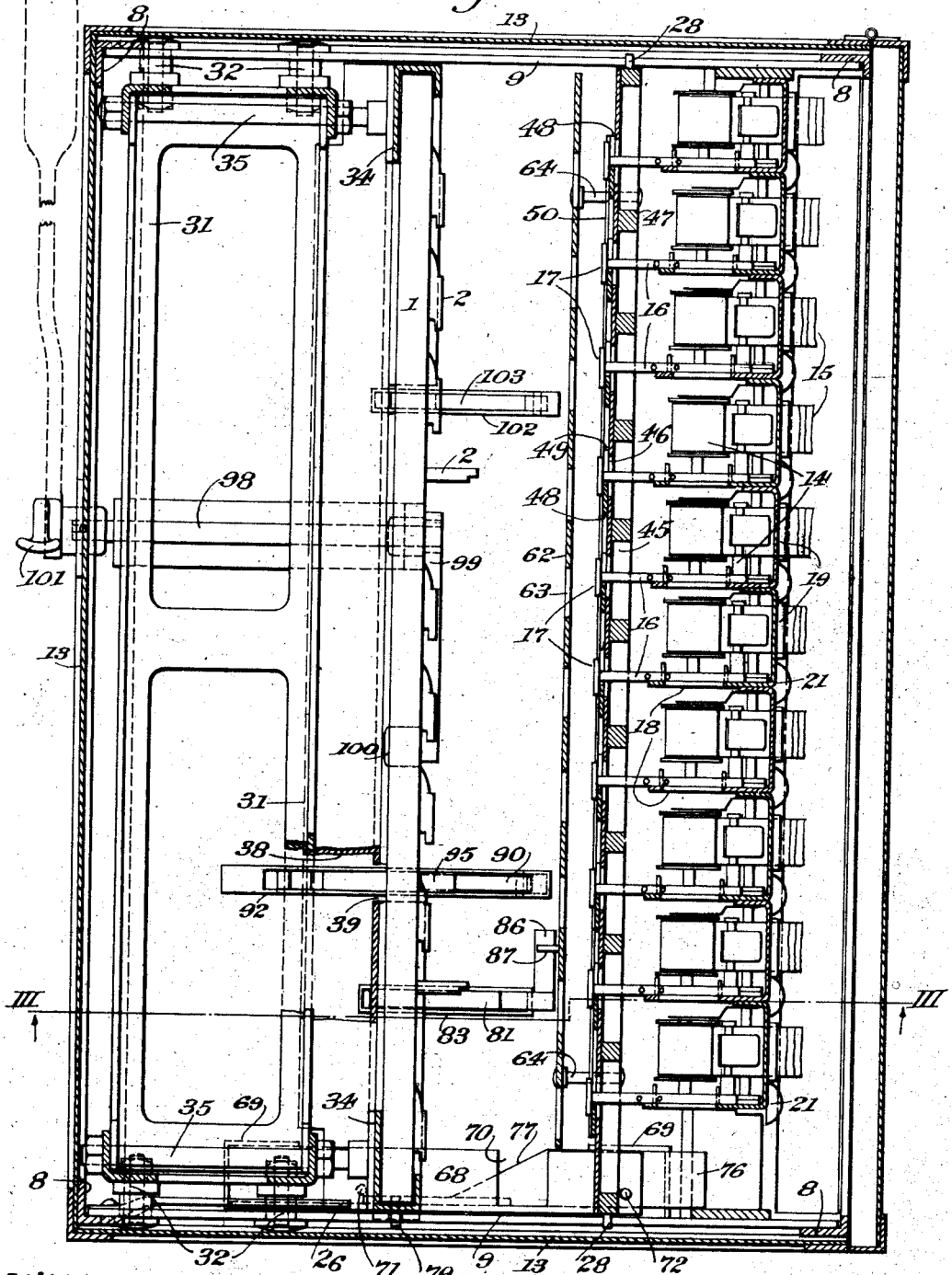
Fig. IX
Witnesses:  
Geo. L. Goetz.  
G. T. Hackley
Inventor  
David L. Newcomb  
by Townsend Bros.  
his attys.

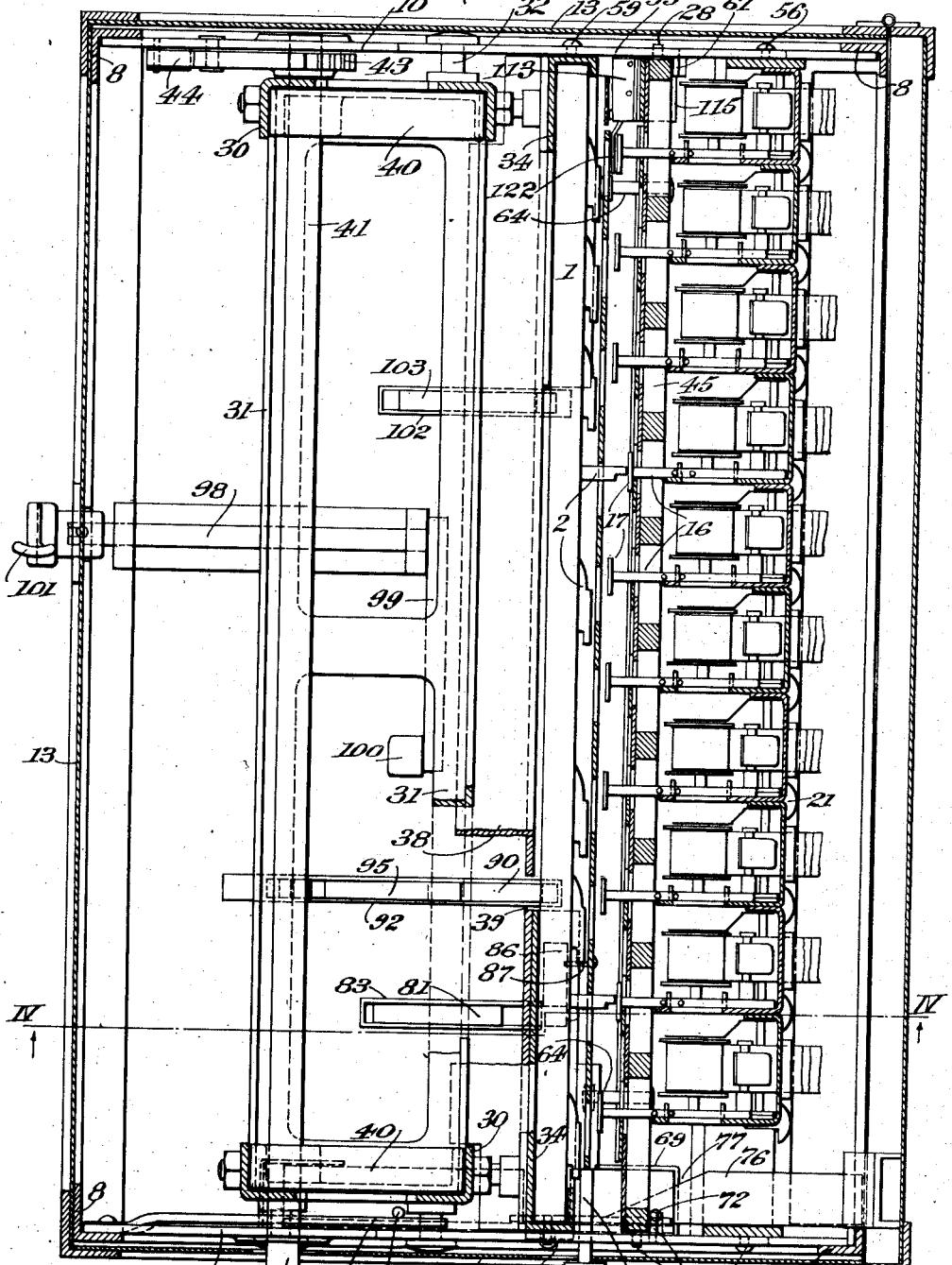

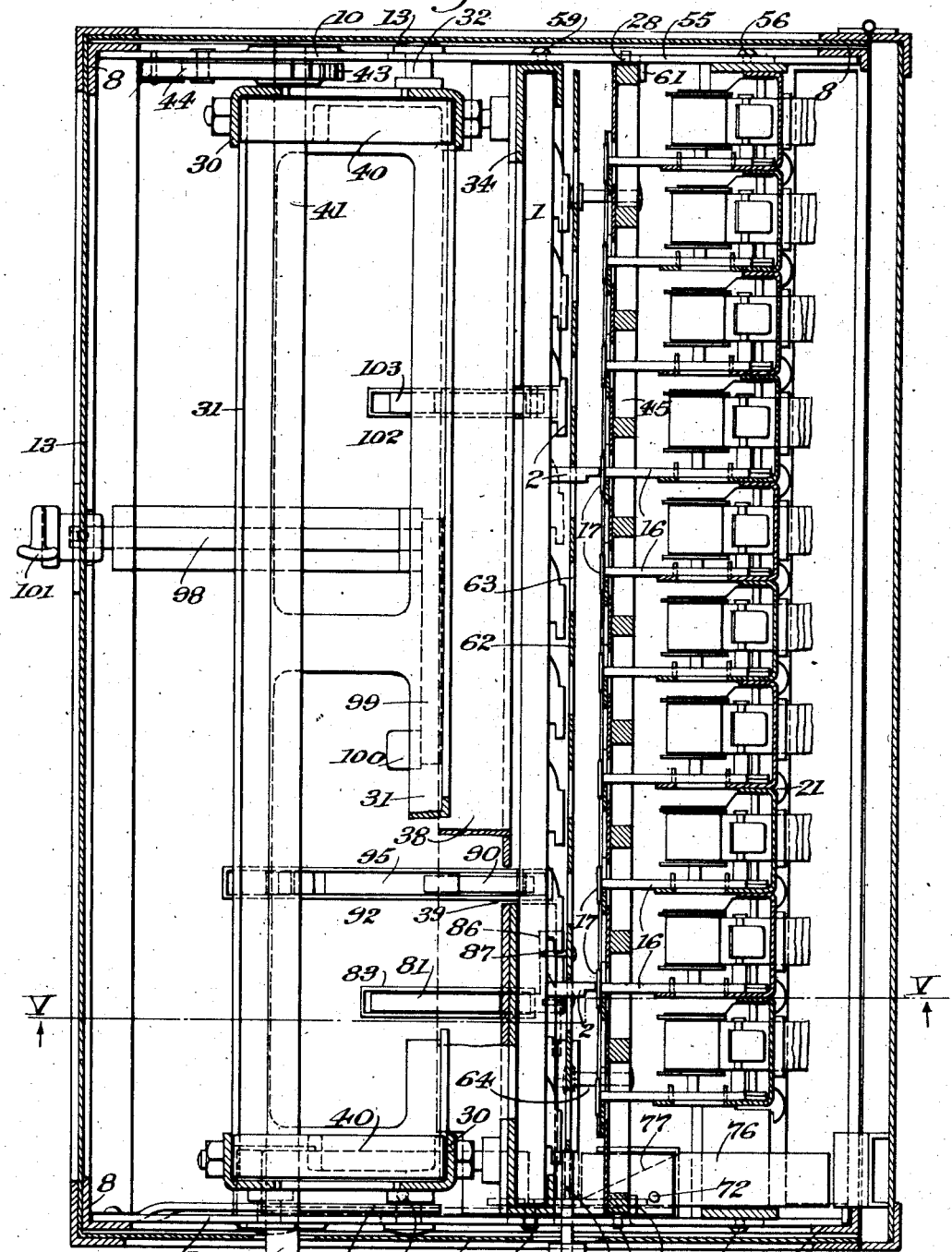

No. 882,160.
PATENTED MAR. 17, 1908.
D. L. NEWCOMB.
VOTE REGISTERING MACHINE.
APPLICATION FILED JUNE 17, 1903.
15 SHEETS—SHEET 10.
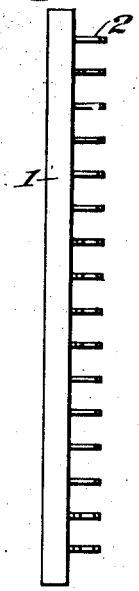
Fig. XIII
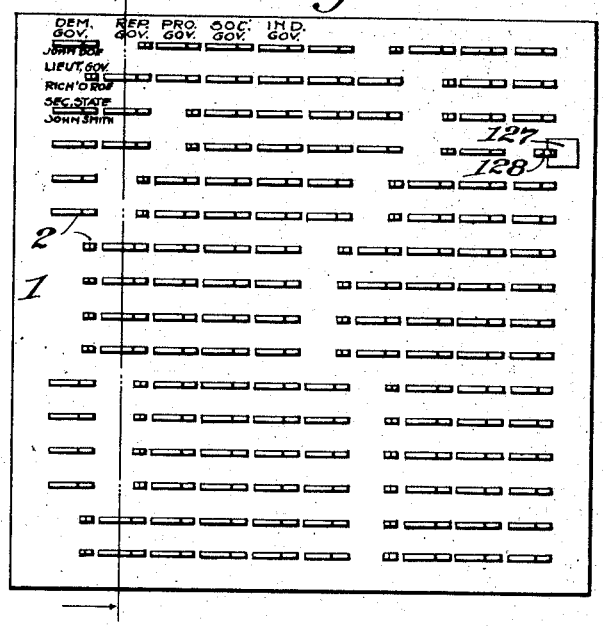
Fig. XII
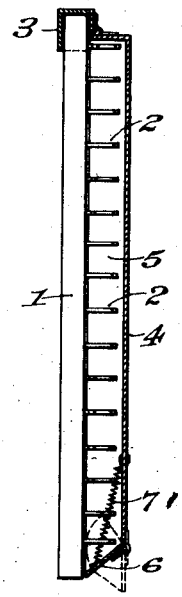
Fig. XV
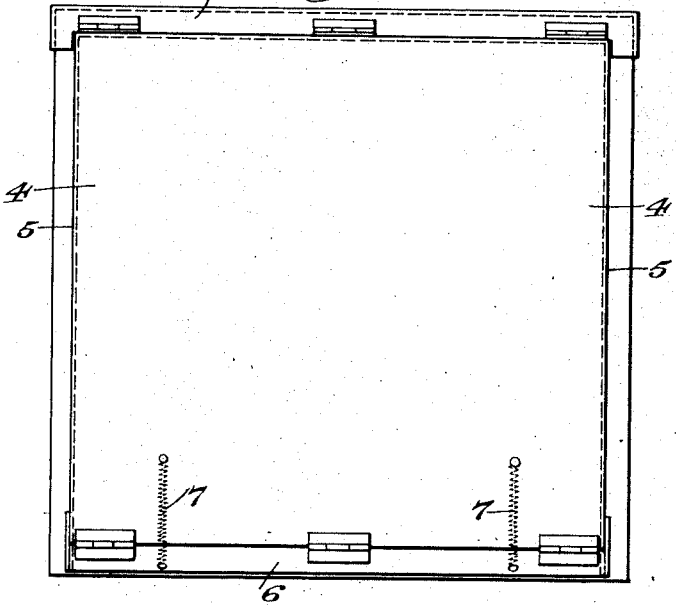
Fig. XIV
Witnesses
Geo. L. Goetz
G. T. Hackley
Inventor
David L. Newcomb
by Townsend Bros.
his attys.

No. 882,160. PATENTED MAR. 17, 1908.
D. L. NEWCOMB.
VOTE REGISTERING MACHINE.
APPLICATION FILED JUNE 17, 1903.
15 SHEETS—SHEET 11.
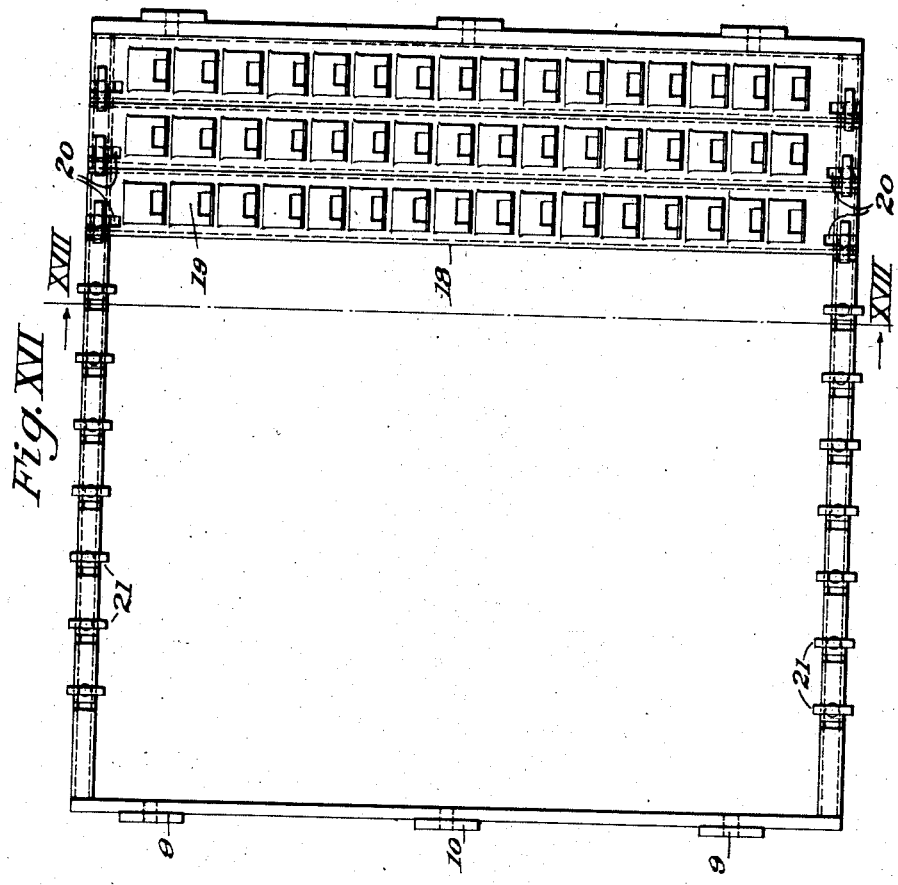
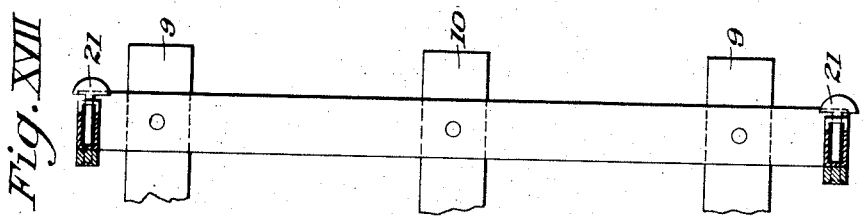
Witnesses:
Geo. L. Goetz
G. T. Hackley
Inventor
David L. Newcomb
by Townsend Bros
his atty.

No. 882,160.
D. L. NEWCOMB.
VOTE REGISTERING MACHINE.
APPLICATION FILED JUNE 17, 1903.
PATENTED MAR. 17, 1908.
15 SHEETS—SHEET 12.
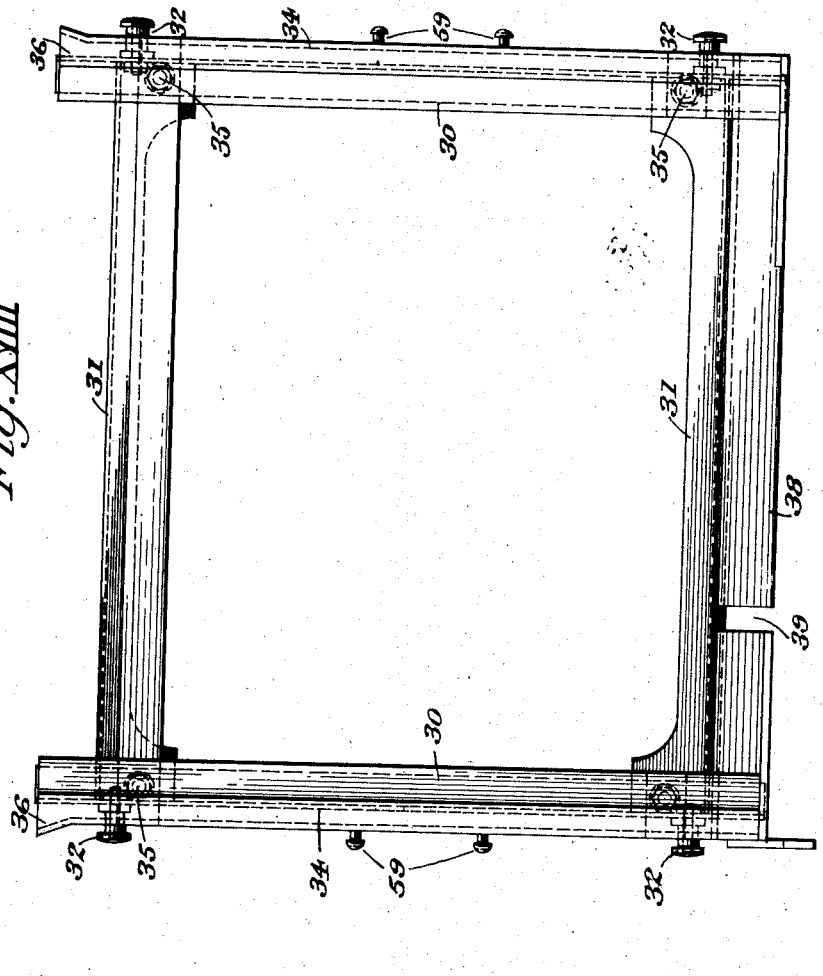
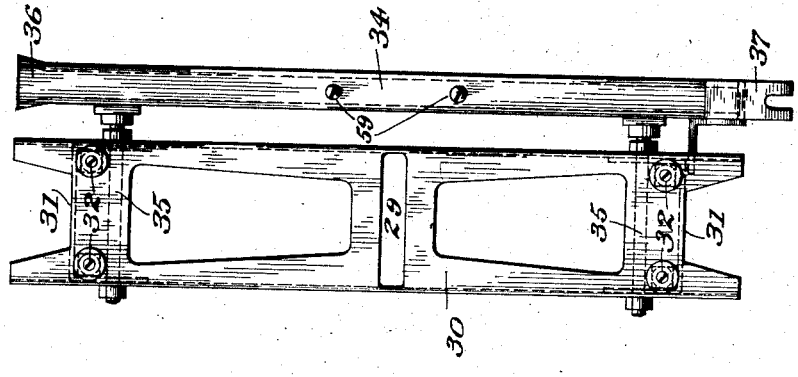

No. 882,160. PATENTED MAR. 17, 1908.
D. L. NEWCOMB.
VOTE REGISTERING MACHINE.
APPLICATION FILED JUNE 17, 1903.
15 SHEETS—SHEET 13.
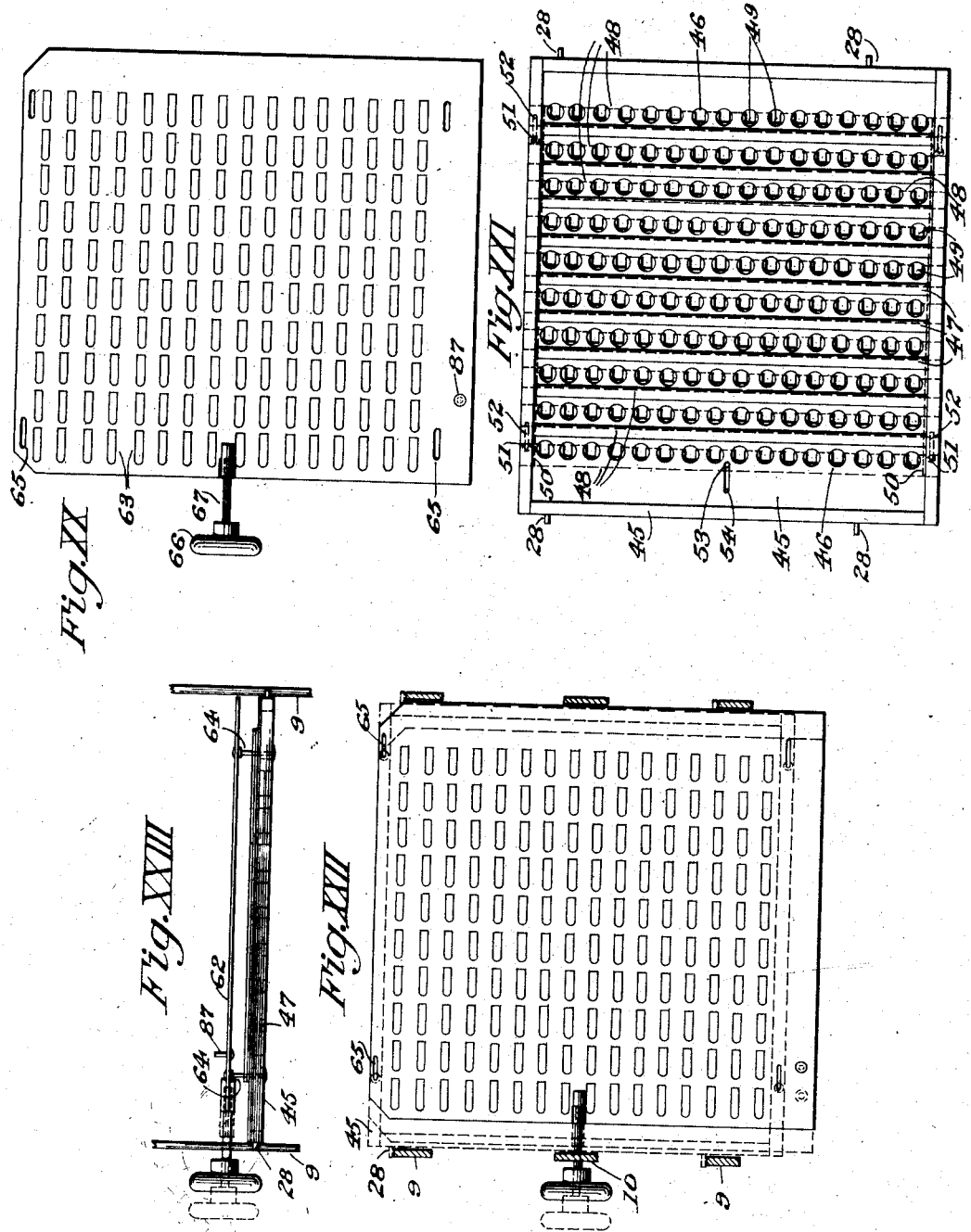
Witnesses:
Geo. L. Goetz
G. P. Hackley
Inventor
David L. Newcomb
by Townsend Bros.
his attys.

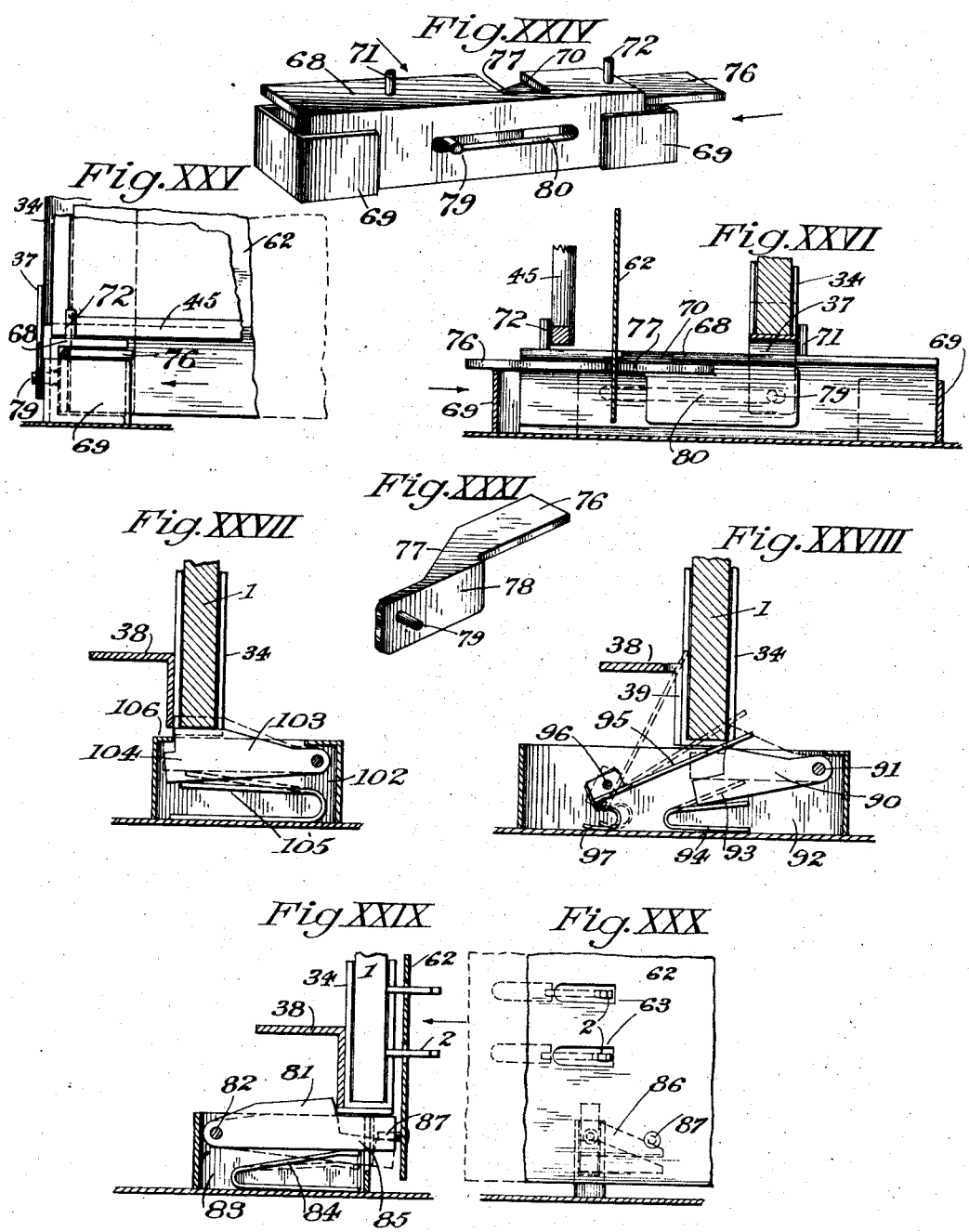

No. 882,160. PATENTED MAR. 17, 1908.
D. L. NEWCOMB.
VOTE REGISTERING MACHINE.
APPLICATION FILED JUNE 17, 1903.
15 SHEETS—SHEET 15.
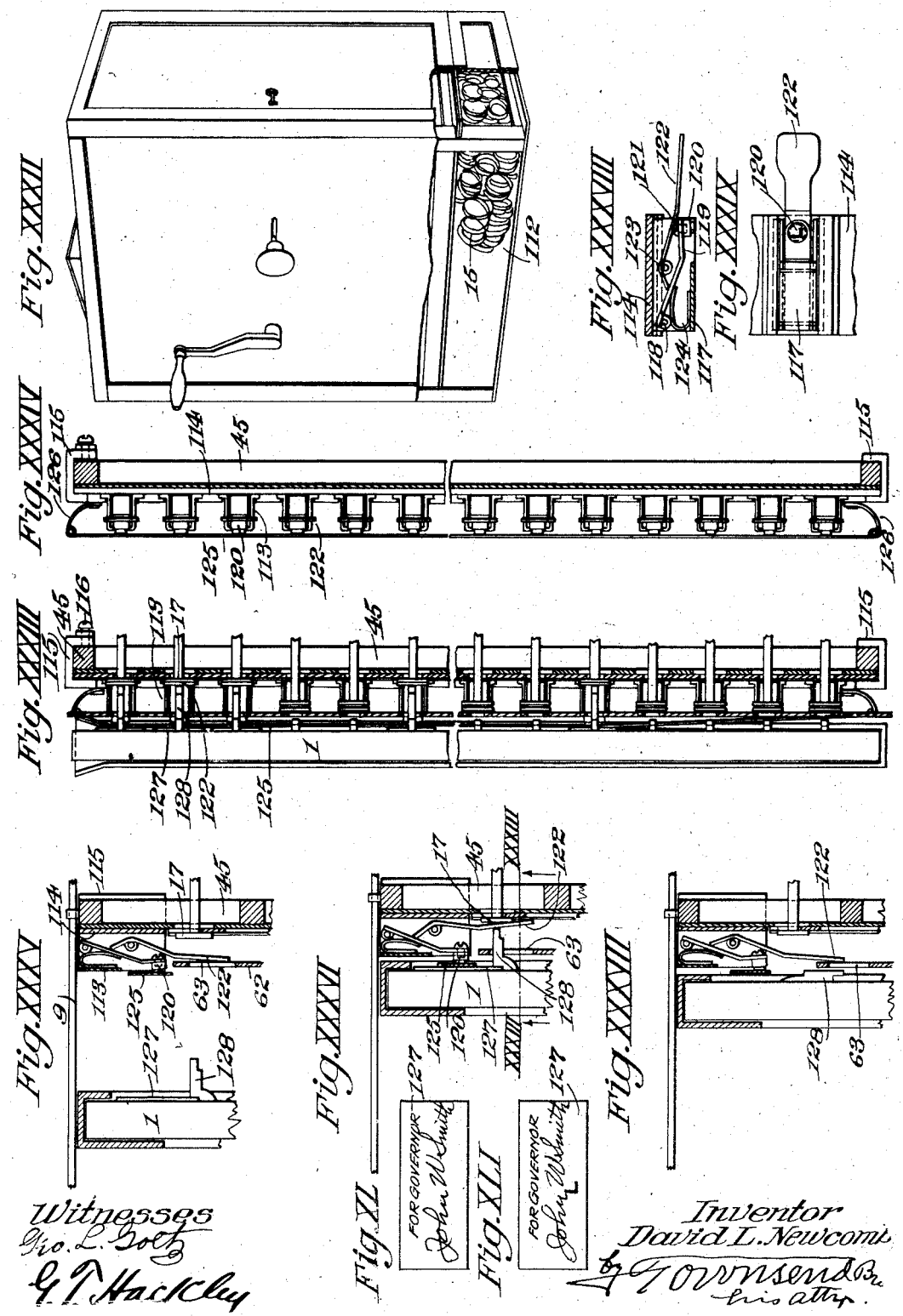
Witnesses
Geo. L. Goetz
G. T. Hackley
Inventor
David L. Newcomb
by Townsend Bro.
his atty.

UNITED STATES PATENT OFFICE.

DAVID L. NEWCOMB, OF SAN DIEGO, CALIFORNIA.

VOTE-REGISTERING MACHINE.

No. 882,160.          Specification of Letters Patent.          Patented March 17, 1908.

Application filed June 17, 1903. Serial No. 161,773.

*To all whom it may concern:*

Be it known that I, DAVID L. NEWCOMB, a citizen of the United States, residing at San Diego, in the county of San Diego and State of California, have invented a new and useful Vote-Registering Machine, of which the following is a specification.

This invention relates to a class of voting machines invented by me, the distinctive feature of which embraces a detached separate and independent mechanical ballot which is adapted to be arranged in a booth, being there first prepared by the voter and afterward placed in the machine which is then operated whereby said ballot positively actuates registers to register and count the vote as prepared on the ballot.

This invention contains many improvements over the inventions illustrated in former applications of mine filed in the United States Patent Office, July 31, 1899, Serial Number 725,723, renewed April 14, 1902, Serial Number 102,916 and Serial Number 107,359 filed May 14, 1902.

One form of ballot which is adapted for use in the present invention is shown and described in the last named former application of mine.

One object of my invention is to produce a voting machine of as small a size as possible and yet secure provision for positively actuating registers for counting and registering votes for a large number of candidates.

Another object is to provide an improved mechanism for operating the ballot after it is in the machine.

A further object is to provide improved means for positively tripping the tappets of the ballot.

Another object is to provide means for holding the counters, which register the vote, in a series of banks, and to provide means for detachably holding each bank of counters in the machine.

Another object is to provide means for locking the ballot carrier while the tappet tripper is being operated.

Another object is to give more room for names of candidates and to provide means for moving the tappet tripper sidewise to trip the tappets and restore them to normal position.

Another object is to provide improved means for automatically restoring the tappet tripper to normal position.

Another object is to provide an improved ballot lifter or ejector.

Another object is to provide new and improved means for locking the ballot until the tappets are set to normal position, and to provide improved locking means for locking the ballot to prevent repeating, and to require the use of the ejector before the carrier is again advanced, after each vote.

Another object is to provide means for locking the carrier while a ballot is being removed and until a new ballot is in position.

Another object is to provide means for positively locking the tappet tripper except at such time as the tappet tripper must be actuated.

Another object is to provide means for printing, perforating, stamping, or otherwise marking an independent ticket to accommodate voters who wish to vote for a candidate who may not be represented upon a regular ballot.

Another object is to provide means for holding such independent tickets on the ballot so that when the ballot is moved forward to register the vote the independent ticket will be automatically marked; and means are provided whereby, after the independent ticket has been marked, it will be automatically released from the ballot and dropped into a suitable receptacle. Furthermore; by this invention it is made possible for a plurality of voters using a plurality of mechanical ballots in a plurality of booths to separately, secretly and at the same time prepare their respective ballots for voting for unnominated persons for any or all offices, and to enable such votes to afterwards be accurately registered in the ballot box or registering apparatus, at the same time preventing any unauthorized vote from being registered.

The accompanying drawings illustrate the invention.

Figure I is a perspective of the machine with the front door open and the side casing removed. Fig. II is a view similar to Fig. I with the parts in another position, and with seven individual banks of counters removed, three banks of counters remaining in position. Fig. III is a sectional view taken through the machine on line III—III Fig. IX showing a portion of one of the counter frames broken away and showing the ballot carrier completely retracted. One position of the ballot and ballot shield is shown in dotted lines in which the ballot has not quite reached its seat in the carrier; in full lines the ballot is shown as in conventional position having dropped somewhat below the shield. The shield is shown at its lowest position. Fig. IV is a view similar to Fig. II with the ballot advanced its extreme throw. Fig. V is an enlarged view similar to Fig. IV showing the carrier retracted part way and the actuating rods of the counters retracted. Fig. VI is a side view of the machine with the nearest side wall removed and the ballot carrier fully retracted. Fig. VII is a view similar to Fig. VI showing the ballot carrier advanced. Fig. VIII is a view similar to Fig. VI showing the ballot carrier retracted to the position illustrated in Fig. V. Fig. IX is a sectional view taken on line IX—IX Fig. III looking toward the bottom of the machine. Fig. X is a sectional view taken on line X—X Fig. IV looking toward the bottom of the machine. At the lower side of the view the upper side bar 9 is omitted and the case wall or plate 13 is sectioned on a plane with the axis of shaft 41 and stem 67. Fig. XI is a sectional view on the irregular line XI—XI Fig. V looking toward the bottom of the machine. Fig. XII is a plan view of the face of a ballot such as may be used in the machine. Fig. XIII is a side elevation of the same. Fig. XIV is a plan view of the ballot shield. Fig. XV is a side elevation in which the ballot is covered with the ballot shield and the ballot shield is shown in section. Fig. XVI is a front elevation of the frame which supports the counter frames. Three banks only of counters are shown in place. Fig. XVII is a sectional view taken through Fig. XVI on line XVII—XVII. Fig. XVIII is a front elevation of the ballot holder and carrier. Fig. XIX is an end elevation of the same. Fig. XX is a front elevation of the tappet tripper. Fig. XXI is a front elevation of the retractor. Fig. XXII is a front elevation of the retractor, tappet tripper and frame which supports the same, one position of the tappet tripper being shown in dotted lines. Fig. XXIII is a top view of the same. Fig. XXIV is a perspective view of the tappet tripper lock and tappet tripper shifter. Fig. XXV is a view looking at the parts shown in Fig. XXIV and a portion of the tappet tripper and ballot looking in the direction of the arrow indicated in Fig. XXIV. Fig. XXVI is a view looking at the rear side of the parts shown in Fig. XXIV. Fig. XXVII is a detail view of the lock which prevents the forward movement of the ballot carrier until the ballot is seated in the ballot holder. In this view the lower portion of the ballot is shown and a part of the ballot carrier is shown in section. The lug which supports the lock is also shown in section. Fig. XXVIII is a side view of the lock which prevents repeating i. e. forward movement of carrier and ballot until the ballot is ejected. In this view the lower portion of the ballot is shown with part of the ballot holder in section and the lug which supports the lock is also shown in section. Fig. XXIX is a view of a lock which positively insures that the clerk shall trip the tappets as it prevents the retraction of the carrier until the tappets are tripped. In this view, a portion of the ballot is shown with the tappets raised; a portion of the tappet tripper is also shown and a part of the ballot holder is shown in section. The box which supports the lock is also shown in section, while the relative positions of the locking bolts are illustrated. Fig. XXX is a view looking in the direction of the arrow at the parts shown in Fig. XXIX. Fig. XXXI is a perspective view of the tappet tripper restorer. Fig. XXXI$^a$ is a perspective view of the detent for temporarily locking the ballot-carrier at the point in its retraction where the tappets must be tripped. Fig. XXXII is a perspective view of the machine inclosed in its case; the lower portion of the case is broken away to show the interior of the box into which the lower portions of the registering strips are received as they are passed through the registering mechanism. Fig. XXXIII is a vertical section taken through the machine showing merely the ballot holder, retractor and the marker or printing mechanism for non-nominee votes, the ballot holder having been in its forward position and the tappets having operated the marked or printing devices. Fig. XXXIV is a view similar to Fig. XXXII except that the ballot holder is not shown. Fig. XXXV is a plan view showing one end of the mechanical ballot with an independent tappet raised and shows a non-nominee ticket in the form of a card to be held in position to be printed upon; and one marker or printing device is shown in normal position. Fig. XXXVI is a view similar to Fig. XXXV showing the ballot moved up and the printing device has been actuated by the raised tappet to throw the type against the non-nominee ticket card on the mechanical ballot. Fig. XXXVII is a view similar to Fig. XXXV and shows the relative positions of the ballot and printing device immediately after the card has been printed and the tappet tripped. Fig. XXXVIII is a detail of one of the printing devices, the case being shown in section. Fig. XXXIX is a front elevation of the same looking toward the face of the type. Fig. XL is a view showing a card upon which the voter has written the name of an independent candidate. Fig. XLI is a view of the card after the vote for an independent candidate has been registered in the machine and the authenticating symbol, in this particular instance the letter L is shown as having been printed on the card by the machine.

Referring to Figs. XII, XIII, XIV and XV 1 designates a mechanical ballot which is adapted to be used in the vote registering machine forming the present invention. There may be several of these ballots provided for each machine, so that in an election several voters may be preparing their ballots and the ballots may be placed in the machine one after the other and registered as fast as the machine can accommodate them. The ballot is provided with several rows of tappets 2, each tappet being pivotally mounted in the ballot to swing in a plane perpendicular to the face thereof. At the top of the ballot the name of the party may be placed over each row and after each ballot in each row may be placed the name of a candidate. In voting, the ballot is presented to the voter with all of the tappets closed against the face of the ballot and the voter indicates his choice of candidates by swinging out the tappet under each candidate he wishes to elect, so that the tappets which stand for his chosen candidates will stand perpendicularly to the face of the ballot, when he has prepared his ballot. When the ballot is prepared the shield is placed over it. This consists of a casing 3, which fits the upper edge of the ballot and pivoted to the casing 3 is a flap 4, which covers the face of the ballot and hides the tappets. The outer side edges of the flap 4 are provided with side walls 5. The lower end of the flap is provided with a hinged lid 6. The lower ends of the walls 5 are sloping and the lid 6 is normally held against the sloping ends by means of coil springs 7 which are connected underneath the flap 4.

Referring now to the drawings in general, the main frame of the machine comprises front and rear rectangular frames 8 which are united by side bars 9 and 10. Hinged to the front frame 8 is a door 11 and hinged to the rear frame 8 and covering the top of the machine is a cover 12. The back and sides of the machine may be inclosed by suitable plates 13.

In Figs. I and II the nearest side plate has been removed. The door 11 and cover 12 are shown open. For each candidate who is to be voted for I provide an individual counter and in the present embodiment I have shown a counter which is fully described and claimed in another application of mine filed March 3, 1903 Serial Number 145,931. This counter is so constructed that when actuated it unrolls a numbered tape and the tape is pushed step by step out of the counter. Each time the counter is actuated the tape is advanced a step and a new number brought into view.

Referring to Figs. III and IV; these counters are shown designated in general by 14. 15 designates the numbered strip which is actuated by the counters. Each counter is provided with an actuating rod 16, the rear end of which carries a button 17. In this embodiment I have shown the counters 14 arranged in a series of banks, each bank containing sixteen counters. Each bank of counters is supported in a counter frame 18 and in the embodiment shown there are ten counter frames and sixteen counters in each frame. The front wall of a frame is provided with hoods 19, one opposite each counter, through which the tape from the adjacent counter issues and the counter frames are removably held in the machine. Each end of the counter frame is provided with a slotted extension 20. 21 are flattened buttons provided with shanks screwed to the frame 8 and the shanks of the buttons 21 extend through the slots in the extensions 20. By turning the buttons to register with the slots, the counter frame may be removed from the machine.

In Fig. II seven of the counter frames have been removed leaving three in place. In Fig. I only a few strips have been shown projecting through the hoods a short distance in order to clearly show the counter frames. The cover 12 is provided with a slot 22 which is closed by a lid 23, the latter being yieldingly held down by means of a spring 24. The slot 22 provides an opening for the insertion of the ballot into the machine. When the ballot has been prepared it is inserted into the machine and by means of the mechanism hereinafter described moved forward and those tappets which stand perpendicularly to the ballot are forced against their respective buttons 17 and as the ballot is moved forward the counters registering with the raised tappets are actuated and each counter registers one vote for each candidate for whom a tappet is raised. The ballot is then moved back and the actuating arms 16 of the counters are automatically retracted. The ballot is then removed from the machine and the machine is ready for the insertion of another ballot.

The means for operating the ballot and for controlling the proper manipulation of the ballot while it is in the machine comprises a ballot carrier and a series of automatic locks or checks therefor. The ballot carrier comprises a carriage consisting of a pair of side frames 30 which are connected by horizontal plates 31. The side frames 30 are provided at top and bottom with pairs of studs 32 which ride in slots 33 in the bars 9. Mounted on the ballot carrier is a ballot holder, see Figs. XVIII and XXIX, which comprises a pair of opposite vertical troughs 34 which are mounted on the ends of suitable posts 35 secured to the ballot carrier. The upper end of each trough 34 is flared as at 36 to permit of the ballot being easily inserted. Projecting from the lower end of one trough 34 is a slotted plate 37 the purpose of which will hereinafter be described.

38 is an angle bar which connects the lower end of the troughs 34 and which is provided with a slot 39. The ballot carrier is moved toward or away from the counters by means of eccentric cams 40 which bear against the flanged ends of the side frames 30 and which are rigidly mounted upon a shaft 41 the latter being journaled in the side bars 10 and provided at one end with a crank 42 whereby it may be revolved. Rigidly mounted on the shaft 41 is a retaining ratchet 43, which is engaged by a spring pressed pawl 44 pivoted to one of the side bars 10. This prevents the shaft 41 from being turned reversely. Each side frame 30 is slotted as at 29 to permit of the reciprocation of the frames across the shaft 41. The ballot carrier 34 may be accurately adjusted parallel to the plane of the counter buttons 17 by moving the posts 35 in or out and then clamping the same by their set nuts. Before the ballot is placed in the machine it is covered by the ballot shield as shown in Figs. XIV and XV. The ballot clerk lifts the lid 23 and slides the ballot and shield together into the machine, the ballot sliding down the troughs 34. The ballot shield enters the machine until the casing 3 rests on top of the flaring ends 36 of the troughs 34. In Fig. III the shield is shown in dotted lines as being in such position. When the shield has reached this position however, the ballot continues to drop until it is seated with its lower end resting upon the angle bar 38. The ballot clerk then withdraws the shield and turns the crank 42 which advances the carrier and the raised tappets on the ballot are pushed against their respective buttons 17 and operate certain of the counters. After the counters have been actuated and the carrier has started on its return movement the actuating rods of the counter are retracted by a retractor 45 which is provided with a series of perforations 46, one for each actuating arm of the counters. The retractor is provided with stiffening ridges 47.

48 designates a series of plates, provided with notches 49, which are connected together by horizontal strips 50. The plate 48 and strips 50 form a locking frame which is adjustably mounted flat against the retractor 45 to which the frame is secured by means of screws 51 which pass through slots 52 in the strips 50.

53 is a stud carried by one of the plates 48 which projects through a slot 54 in the retractor 45 and affords a convenient handle on the retractor when it is desired to adjust the same.

In construction the retractor is placed in position by first shifting the locking frame, so that the notches 49 of the plates 48 will stand to one side of the perforations 46, this allows the retractor to be pushed over the buttons 17, the latter being pushed through the perforations 46 slightly. The locking frame is then shifted back into the position shown in Fig. XXI and the plates 48 then lie under the heads of the buttons 17 after which the screws 51 are tightened to prevent accidental displacement of the locking frame.

55 designates retracting levers, one pair being provided for each side of the machine. The two levers forming a pair are symmetrical and arranged at opposite sides of the cross bar 10 the levers being pivoted as at 56 to the vertical bar of the frame 8. Each retractor lever 55 is provided with a horizontal arm 57 which has a horizontal slot 58. The slots are cut so that forwardly they converge.

59 are studs mounted on the outside of troughs 34 of the ballot holder, each stud projecting through a slot 58. Each retractor lever is provided with a vertical arm 60 the end of which is turned over to form a toe 61. Each toe 61 bears against the forward face of the retractor 45 and as the ballot is advanced to register a vote the forward movement of the ballot holder carries the stud 59 forward in the slots 58, and when the studs reach the inclined walls of the slots they roll each retractor lever and throw the toes 61 toward the front of the machine at the same time that the retractor is moved forward by pressure of the buttons 17 which are pushed forward by the raised tappets. Continued rotation of the crank 42 starts the ballot carrier on its return and as the ballot holder is retracted the studs 59 riding to the rear of slots 58 tilt the retractor levers and throw the toes 61 rearwardly and the latter push the retractor to the rear, the retractor pulling back the actuating arms which have been moved forward in registering the vote. This movement of the retractor continues until the studs 59 have reached the horizontal portion of the slots 58 at which time the tilting of the retractor levers ceases and they lie stationary in their normal position and the retractor is moved no further back.

After the vote has been registered it is preferred to trip the standing tappets and restore them to normal position very soon after the ballot has started its return and immediately after the free ends of the tappets have sufficiently cleared the perforations 46 and notches 49.

62 is a tappet tripper formed of a rectangular plate which is provided with elongated perforations 63, one perforation for each tappet. The tappet tripper 62 is slidably mounted on studs 64 which pass through slots 65 in the tappet tripper, the studs 64 being mounted on the retractor 45.

66 is a knob connected with the tappet tripper by a stem 67 affording means for manually operating the tappet tripper.

I have provided a tappet tripper lock 68 which in the present embodiment is in the form of a U-shaped plate slidably mounted in a lug 69 carried by the frame. The plate 68 is provided with a slot 70 and also with two pins 71 and 72. The lower end of the ballot holder has a path of movement which throws it against the pins 71 during part of its movement. When the parts of the machine are in their normal positions as shown for instance in Fig. VI, the lower end of the ballot holder is bearing against the pin 71 and the tappet tripper lock 68 is in its rearward position and the slot 70 stands to the rear of the tappet tripper and a portion of the plate 68 stands across the edge of the tappet tripper so that it is impossible to operate the tappet tripper at such time. When the ballot is advanced to operate the counters and the retractor 45 is pushed forward and the lower end of the retractor bearing against pin 72 shifts the tappet tripper lock 68 forward and brings the slot 70 in front of the edge of the tappet tripper.

73 is a detent pivoted to the main frame of the machine as at 74 and is provided with a notch 75 and a finger 76 which finger rests by gravity upon the studs 32. As the ballot carrier moves forward the stud 32 frees the finger 76 allowing the detent 73 to drop over the rear end of the tappet tripper lock 68. As the latter is moved forward by the retractor 45 bearing against the pin 72 the notch 75 is dropped over the rear end of the tappet tripper lock 68 and locks the same in its forward position. The ballot carrier has a considerable movement forward after the detent 73 has dropped into engagement with the tappet tripper lock 68 as will be seen from a glance at Fig. VII. As soon as the ballot has been retracted sufficiently to allow the ends of the tappets to clear the retractor, the ballot clerk pulls out the tappet tripper and the standing tappets are thereby dropped. Means are provided for automatically restoring the tappet tripper upon the first backward movement of the ballot carrier after the tappet tripper has tripped the tappets which consists of a slide 76 provided with a beveled face 77 and a down-turned wing 78 which carries a stud 79 which latter projects into the slotted plate 37. The slide 76 is mounted just below the upper plate of the tappet tripper lock 68 while the wing 78 bears against the side wall of the tappet tripper lock 68. The stud 79 projects through the slot 80 formed in the side wall of the tappet tripper lock 68. As the ballot holder is moved back the slide 76 is retraced and the beveled face 77 slides against the edge of the tappet tripper and pushes the same back to its normal position, the stud 79 being drawn to the rear end of the slot 80 by means of the slotted plate 37.

In order to stop the retraction of the carrier at the point where the tappet tripper should be actuated in order to compel the clerk to trip the tappets before further operating the machine, I have provided the following mechanism:

81 is a detent pivoted at 82 to a slotted lug 83, the detent being guided between the opposite walls of the lug.

84 is a leaf spring within the lug 83 and serves to press the detent 81 upwardly and as the ballot holder is advanced the bottom of the same rides over the upper faces of the detent 81 depressing the latter and as soon as the ballot holder has been moved into the position shown in Fig. V, the detent 81 springs upward until its toe 85 strikes against the bottom of the ballot holder, as shown in Fig. XXIX, this prevents any possibility of the backward movement of the ballot holder from this point until the detent 81 has been depressed. The ballot is advanced a slight distance from this position to actuate the registers, and the ballot holder comes into contact with the detent 81 as shown in Fig. XXIX. It is now impossible to rotate the crank 42 and operate the machine any further until the tappets have been tripped by pulling the tappet tripper sidewise.

86 is an inclined offset on the toe 85 which lies close to the rear face of the lower edge of the tripping plate and projecting from the tripping plate is a pin 87 which lies over and in contact with the inclined face of the offset 86 as shown in Figs. XXIX and IX. When the ballot clerk pulls the tappet tripper out and trips the tappets, the pin 87 presses against the offset 86 and riding along the inclined face of the latter depresses the detent 81 into the position shown in dotted lines in Fig. XXIX. The crank 42 may then be turned to actuate the machine further and retract the ballot carrier and ballot holder and ballot as the detent 81 is free from the ballot holder. As the slide 76 is actuated thereby, as before explained, the inclined face 77 of the slide 76 pushes over the tappet tripper and restores it to normal position.

After the ballot holder has been fully retracted, it is locked by means of the mechanism illustrated in detail in Fig. XXVIII and the ballot must be lifted out of the holder before the machine can again be operated. The mechanism for doing this comprises a detent 90 pivoted at 91 to a slotted lug 92. The rear end of the detent 90 is provided with a toe 93.

94 is a leaf spring under the detent which serves to normally raise the detent.

95 is a latch guard formed of a flat piece of sheet metal which is pivoted at 96 to the lug 92 and its lower end is provided with a curved spring 97 which serves to normally hold the latch guard 95 bearing against the upper edge of the detent 90. The lower angle bar 38 of the ballot holder is slotted as at 39 the width of the slot being sufficient to allow the latch guard 95 to pass through the same. When the ballot is seated the lower edge of the ballot bridges the slot 39. As the ballot carrier is retracted the bottom of the ballot rubs over the top face of the detent 90 and depresses the same. As soon as the ballot comes in contact with the end of the latch guard 95 it gradually lifts the latter and ultimately brings the latch guard into the highest position shown in Fig. XXVIII. When the ballot holder is in this position, the detent 90 springs up, bears against the lower front edge of the ballot, and locks the same from forward movement. Before the machine can be operated further the ballot clerk must lift out the ballot and when he does so as the ballot is raised and comes above the end of the plate 95, the latter is freed and allowed to drop down upon the upper corner of the detent 90, in its descent swinging through the slot 39.

The means for partially ejecting the ballot comprises a shaft 98 journaled in bearings on the bottom of the frame of the machine. One end of the shaft 98 projects through the back wall of the frame of the machine, and the inside end of the shaft has attached thereto a lever 99 which carries an antifriction roller 100 which lies under the bottom of the ballot.

101 is a hand lever carried by the outer end of the shaft 98.

Before lifting the ballot out the ballot clerk depresses the hand lever 101 rocks the shaft 98, tilts the lever 99 and raises the roller 100 up against the bottom of the ballot and the continued movement of the hand lever pushes the ballot up through the slot 22 and as soon as the hand lever 101 has been brought to a horizontal position the lever 100 is canted slightly beyond a vertical position so that the weight of the ballot resting upon the roller 100 tends to further depress the hand lever 101, but as the latter will be in contact with the table or other support upon which the voting machine rests the hand lever will not move downward but will cause the ballot to be sustained. The clerk is then enabled to readily remove the ballot from the machine and insert a fresh ballot.

It will be remembered that when there is no ballot in the machine and the parts are all retracted that the latch guard 95 is in one of its lower positions resting upon the upper corner of the detent 90, and when a new ballot is inserted into the ballot holder, the lower end drops onto the upper face of the latch guard 95 depressing the latter and the latter in turn depressing the detent 90 into the position shown in dotted lines in Fig. XXVIII. When the ballot carrier is advanced and the ballot moved forward, the bottom of the ballot easily slides over the upper face of the latch guard 95 clear of the detent 90.

After the ballot has been removed from the machine I have provided means for preventing further operation of the machine until a fresh ballot is inserted, which comprises the mechanism shown in Fig. XXVII in which 102 is a slotted lug in which is pivoted a detent 103 provided with a toe 104. Underneath the detent 104 is a flat spring 105 for raising the detent. The lug 102 is provided with a latch 106 against which the toe strikes which affords a means for limiting the upper movement of the detent 103. As shown in Fig. XXVII when the detent 103 is raised its end stands in front of the angle bar 38 and prevents forward movement of the ballot holder. When a fresh ballot is placed in the machine the detent 103 is depressed to the position shown in full lines Fig. XXVII and allows the ballot to be advanced.

In order to register the total number of votes I provide a counter 110 of ordinary construction provided with an actuating rod 111 the end of which lies in the path of movement of the retractor and as the retractor is moved forward by the ballot holder the retractor presses against the end of the actuating rod 111 and registers a vote.

Referring to Fig. XXXII: 112 designates a receptacle underneath the machine and within the casing of the machine into which the numbered strips 15 fall and may curl up inside the same as they are advanced by the registering mechanisms. When a voter wishes to cast a vote for a party whose name is not on the ballot, I have provided means whereby the voter can place a card, on the ballot, upon which he has written the name of the independent party he wishes to vote for. This card will be held by a raised tappet and when the ballot is moved forward to register the raised tappet which holds the card it will actuate a printing device which will impress upon the card, a symbol which authenticates the card. By printing a character upon the card automatically after the card has been placed on the ballot and after the ballot has been placed in the machine it makes it impossible for an independent vote to be fraudulently cast. The types are interchangeable and may be moved into different positions or they may be placed in different printing devices to make it impossible for the voter to know positively just what character will be placed upon the card. The writing of the name of the candidate upon the card by the voter and placing the card on the ballot is all that the voter does; this only partially prepares the independent vote, the authentication of the independent ballot is done by the machine.

Referring to Figs. XXXIII and XXXIV: 113 designates in a general way the independent printing devices which may be carried on a strip 114. The strip 114 may be arranged vertically at one side of the machine and may be rigidly fastened to the retractor 45 by means of top and bottom brackets 115 which may be detachably held on the retractor 45 by means of screws 116. In the present embodiment I have shown thirteen printing devices on the strip 114. Each printing device comprises a case 117 to which is pivoted as at 118, a type bar 119. The outer end of the type bar 119 carries a type 120 which may preferably be attached to the type bar by a screw 121. By loosening the screw 121 the type may be turned so that the appearance of the character printed upon the card may if desired be changed from time to time in order to doubly guard against any fraud. 122 is a lever pivoted at 123, the inner end of which rests against the rear face of the type bar 119 while the outer end is enlarged. 124 is a flat spring between the type bar 119 and case 117 which serves to normally hold the type bar retracted as shown in Fig. XXXVIII. When the lever 122 is rocked its inner end pushes out the type bar 119 and projects the type 120. 125 is an inking ribbon which lies in front of each type and which is supported by brackets 126 arranged at the top and bottom of the strip 114.

Referring to Fig. XL, a card is shown upon which the voter has written the name of the party for whom he wishes to vote. The voter having prepared his ballot as before described in voting for the regular candidates, places the card which he has prepared for the independent party upon the ballot and pulls up an independent tappet which clasps the card tightly against the ballot as shown in Fig. XXXV, the card 127 resting underneath a shoulder on the tappet. The ballot having been placed in the machine, when the machine is operated and the ballot moved forward, the independent tappet 128 strikes against the lever 122 which forces out the type 120 against the ribbon 125 and prints the character upon the card simultaneously with the actuation of the registering mechanism by the other raised tappets which stand for the regular candidates. As soon as the independent tappet 128 is tripped, which occurs at the same time and is accomplished in the same manner in which the other tappets are tripped, the card 127 is raised and falls down into the receptacle 112.

What I claim and desire to secure by Letters Patent of the United States is:—

1. In combination separate and independent registers, a ballot carrier, a detached ballot and means for moving the ballot carrier and actuating said registers through the medium of said ballot.

2. In combination, separate and independent registers, a ballot carrier, a detached ballot and means for moving said ballot carrier and actuating the registers through the medium of said ballot, and means for lifting the ballot.

3. In combination, a casing registering mechanism carried thereby, a ballot carrier mounted therein, a detached ballot adapted to be connected with the carrier, means for operating the ballot carrier and actuating said registering mechanism through the medium of said ballot, a rock shaft, a lever carried by the rock shaft and under said ballot a hand lever carried by said shaft outside of said casing.

4. In combination, a casing, a registering mechanism carried thereby, a ballot carrier mounted therein, a ballot connected with the carrier, means for operating the ballot carrier and actuating said registering mechanism through the medium of said ballot, a rock shaft, a lever carried by the rock shaft, an antifriction roller carried on the end of said lever, and under said ballot a hand lever carried by said shaft outside the casing.

5. In combination, a registering mechanism, a ballot carrier, a detached ballot adapted to be connected thereto, means for operating the ballot carrier and actuating said registering mechanism through the medium of said ballot and means for restoring the ballot to normal condition after the registering mechanism has been operated.

6. In combination, a registering mechanism, a ballot carrier, a detached ballot connected thereto, means for operating the ballot carrier and actuating said registering mechanism through the medium of said ballot and means for restoring the ballot to normal condition after the registering mechanism has been operated and means for automatically restoring the last named means.

7. In combination, a registering mechanism, a ballot carrier, a detached ballot connected thereto, means for operating the ballot carrier and actuating said registering mechanism through the medium of said ballot and means for restoring the ballot to normal condition after the registering mechanism has been operated and means for locking the ballot carrier after the registering mechanism has been operated, said means being controlled by the means which restore the ballot to normal condition.

8. In combination, a registering mechanism, a ballot carrier, a detached ballot adapted to be arranged in a booth apart from the carrier, means for operating the ballot carrier and actuating said registering mechanism through the medium of said ballot, means for restoring the ballot to normal condition and means for locking the ballot carrier immediately before said ballot is restored to normal condition.

9. In combination, a registering mechanism, a ballot carrier, a detached ballot, means for operating the ballot carrier and actuating the registering mechanism through the medium of the ballot, and means for locking the ballot carrier when the ballot is unconnected therewith.

10. In combination, a registering mechanism, a ballot carrier, a ballot detachably connected to the ballot carrier and adapted to be arranged in a booth apart from the carrier, means for operating the ballot carrier and actuating said registering mechanism through the medium of the ballot, and means for automatically locking the ballot carrier when the ballot is removed.

11. In combination, a registering mechanism, a ballot carrier, a ballot detachably connected to the ballot carrier, means for operating the ballot carrier and actuating said registering mechanism through the medium of the ballot, means for automatically locking the ballot carrier when the ballot is removed, and means for automatically unlocking the ballot carrier when the ballot is connected thereto.

12. In combination, a casing, registering mechanism carried thereby, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a tripping plate and means to automatically restore the tripping plate to normal position after the tappets have been tripped.

13. In combination, a casing, registering mechanism carried thereby, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a horizontal tripping plate and means to automatically restore the horizontal tripping plate to normal position after the tappets have been tripped.

14. In combination, a casing, registering mechanism carried thereby, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a tripping plate and a slide provided with a bevel face which is movable against the edge of the tripping plate and a connection between the slide and the ballot carrier.

15. In combination, a casing, registering mechanism carried thereby, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a tripping plate, a slide provided with a bevel face which is movable against the edge of the tripping plate and a connection between the slide and the ballot carrier and means for locking the tappet tripper when the ballot carrier is retracted.

16. In combination, a casing, a registering mechanism carried thereby, a ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip.

17. In combination, a casing, a registering mechanism carried thereby, a ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip and means for restoring said tappet tripper.

18. In combination, a casing, a registering mechanism carried thereby, a ballot carrier therein, a ballot connected with the ballot carrier, means for actuating the ballot carrier and operating the registering mechanism through the medium of the ballot, a tappet tripper, means for locking the tappet tripper, a notched plate and connections from the plate to the ballot carrier.

19. In combination, a casing, registering mechanism carried thereby, a ballot carrier mounted therein, a ballot connected to the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper and a connection between the slide and said tappet tripper lock.

20. In combination, a casing, registering mechanism carried thereby, a ballot carrier mounted therein, a ballot connected to the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper, said tappet tripper lock being provided with a slot and a pin carried by the slide and projecting through said slot.

21. In combination, a casing, registering mechanism therein, a ballot carrier, a ballot connected thereto, means for actuating said ballot carrier and operating the registering mechanism through the medium of the ballot, a tappet tripper, a tappet tripper lock comprising a notched plate, a slide slidably mounted on the tappet tripper lock, a pin on the slide projecting through the slot in the tappet tripper lock, a notched plate connected with the ballot carrier and engaging said pin, said slide having a bevel face adjacent the edge of the tappet tripper, a notched portion of said tappet tripper lock being movable by the edge of the tappet tripper and means carried by the tappet tripper lock and lying in the path of movement of means carried by the ballot carrier.

22. In combination, registering mechanism, a ballot carrier, a ballot holder mounted on the ballot carrier, a detached ballot adapted to be arranged in a booth apart from the carrier and means for moving the ballot carrier and actuating said registers through the medium of said ballot.

23. In combination, a registering mechanism, a ballot carrier, a ballot holder mounted on the ballot carrier, a detached ballot adapted to be arranged in a booth apart from the carrier and means for moving said ballot carrier and actuating the registering mechanism through the medium of said ballot, and means for partially ejecting the ballot.

24. In combination, a casing, registering mechanism carried thereby, a ballot carrier mounted therein, a ballot holder mounted on the ballot carrier, a detached ballot connected with the carrier and adapted to be arranged in a booth apart from the carrier, means for operating the ballot carrier and actuating said registering mechanism through the medium of said ballot, a rock shaft, a lever carried by the rock shaft, an antifriction roller carried on the end of said lever, and under said ballot and a hand lever carried by said shaft outside of said casing.

25. In combination, a registering mechanism, a ballot carrier, a ballot holder mounted on the ballot carrier, a detached ballot connected thereto and adapted to be arranged in a booth apart from the carrier, means for operating the ballot carrier and actuating said registering mechanism through the medium of said ballot and means for restoring the ballot to normal condition after the registering mechanism has been operated.

26. In combination, a registering mechanism, a detached ballot carrier, a ballot holder mounted on the ballot carrier, a ballot connected thereto and adapted to be arranged in a booth apart from the carrier, means for operating the ballot carrier and actuating said registering mechanism through the medium of said ballot and means for restoring the ballot to normal condition after the registering mechanism has been operated and means for automatically restoring the last named means.

27. In combination, a registering mechanism, a detached ballot carrier, a ballot holder mounted on the ballot carrier, a ballot connected thereto and adapted to be arranged in a booth apart from the carrier, means for operating the ballot carrier and actuating said registering mechanism through the medium of said ballot and means for restoring the ballot to normal condition after the registering mechanism has been operated and means for locking the ballot carrier after the registering mechanism has been operated, said means being controlled by the means which restore the ballot to normal condition.

28. In combination, a registering mechanism, a detached ballot carrier, a ballot holder mounted on the ballot carrier, a ballot adapted to be arranged in a booth apart from the carrier, means for operating the ballot carrier and actuating said registering mechanism through the medium of said ballot, means for restoring the ballot to normal condition and means for locking the ballot carrier immediately before said ballot is restored to normal condition.

29. In combination, a registering mechanism, a ballot carrier, a ballot holder mounted on the ballot carrier, a ballot, means for operating the ballot carrier and actuating the registering mechanism through the medium of the ballot, and means for locking the ballot carrier when the ballot is unconnected therewith.

30. In combination, a registering mechanism, a ballot carrier, a ballot holder mounted on the ballot carrier, a ballot detachably connected to the ballot carrier, means for operating the ballot carrier and actuating said registering mechanism through the medium of the ballot, means for automatically locking the ballot carrier when the ballot is removed.

31. In combination, a registering mechanism, a ballot carrier, a ballot holder mounted on the ballot carrier, a ballot detachably connected to the ballot carrier, means for operating the ballot carrier and actuating said registering mechanism through the medium of the ballot, means for automatically locking the ballot carrier when the ballot is removed and means for automatically unlocking the ballot carrier when the ballot is connected thereto.

32. In combination, a casing, registering mechanism carried thereby, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a tripping plate and means to automatically restore the tripping plate to normal position after the tappets have been tripped.

33. In combination, a casing, registering mechanism carried thereby, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a horizontally tripping plate and means to automatically restore the horizontally tripping plate to normal position after the tappets have been tripped.

34. In combination, a casing, registering mechanism carried thereby, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a tripping plate and a slide provided with a bevel face which is movable against the edge of the tripping plate and a connection between the slide and the ballot carrier.

35. In combination, a casing, registering mechanism carried thereby, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a tripping plate and a slide provided with a bevel face which is movable against the edge of the tripping plate and a connection between the slide and the ballot carrier and means for locking the tappet tripper when the ballot carrier is retracted.

36. In combination, a casing, a registering mechanism carried thereby, a ballot carrier, a ballot holder mounted on the ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip.

37. In combination, a casing, a registering mechanism carried thereby, a ballot carrier, a ballot holder mounted on the ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip and means for restoring said tappet tripper.

38. In combination, a casing, a registering mechanism carried thereby, a ballot carrier therein, a ballot connected with the ballot carrier, a ballot holder mounted on the ballot carrier, means for actuating the ballot carrier and operating the registering mechanism through the medium of the ballot, a tappet tripper, means for locking the tappet tripper, a notched plate and connections from the plate to the ballot carrier.

39. In combination, a casing, registering mechanism carried thereby, a ballot carrier mounted therein, a ballot connected to the ballot carrier, a ballot holder mounted on the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper and a connection between the slide and said tappet tripper lock.

40. In combination, a casing, registering mechanism carried thereby, a ballot carrier mounted therein, a ballot connected to the ballot carrier, a ballot holder mounted on the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper, said tappet tripper lock being provided with a slot and a pin carried by the slide and projecting through said slot.

41. In combination, a casing, a registering mechanism carried thereby, a ballot carrier mounted therein, a ballot holder mounted on the ballot carrier, a ballot connected with the carrier, means for operating the ballot carrier and actuating said registering mechanism through the medium of said ballot, a rock shaft, a lever carried by the rock shaft, and a hand lever carried by said shaft outside of said casing.

42. In combination, a casing, registering mechanism therein, a ballot carrier, a ballot connected thereto, a ballot holder mounted on the ballot carrier, means for actuating said ballot carrier and operating the registering mechanism through the medium of the ballot, a tappet tripper, a tappet tripper lock comprising a notched plate, a slide slidably mounted on the tappet tripper lock, a pin on the slide projecting through the slot in the tappet tripper lock, a notched plate connected with the ballot carrier and engaging said pin, said slide having a bevel face adjacent the edge of the tappet tripper, a notched portion of said tappet tripper lock being movable by the edge of the tappet tripper and means carried by the tappet tripper lock and lying in the path of movement of means carried by the ballot carrier.

43. In combination, registering mechanism, said registering mechanism comprising a series of banks of individual counters, a single counter frame carrying each bank of counters, a ballot carrier, a ballot and means for moving the ballot carrier and actuating said registers through the medium of said ballot.

44. In combination, a registering mechanism, said registering mechanism comprising a series of banks of individual counters, a single counter frame carrying each bank of counters, a ballot carrier, a ballot and means for moving said ballot carrier and actuating the registering mechanism through the medium of said ballot, and means for lifting the ballot.

45. In combination, a casing, registering mechanism carried thereby, said registering mechanism comprising a series of banks of individual counters, a single counter frame carrying each bank of counters, a ballot carrier mounted therein, a ballot connected with the carrier, means for operating the ballot carrier and actuating said registering mechanism through the medium of said ballot, a rock shaft, a lever carried by the rock shaft and under said ballot a hand lever carried by said shaft outside of said casing.

46. In combination, a casing, a registering mechanism carried thereby, said registering mechanism comprising a series of banks of individual counters, a single counter frame carrying each bank of counters, a ballot carrier mounted therein, a ballot connected with the carrier, means for operating the ballot carrier and actuating said registering mechanism through the medium of said ballot, a rock shaft, a lever carried by the rock shaft, an antifriction roller carried on the end of said lever, and under said ballot a hand lever carried by said shaft outside of said casing.

47. In combination, a registering mechanism, said registering mechanism comprising a series of banks of individual counters, a single counter frame carrying each bank of counters, a ballot carrier, a ballot connected thereto, means for operating the ballot carrier and actuating said registering mechanism through the medium of said ballot and means for restoring the ballot to normal condition after the registering mechanism has been operated.

48. In combination, a registering mechanism, said registering mechanism comprising a series of banks of individual counters, a single counter frame carrying each bank of counters, a ballot carrier, a ballot connected thereto, means for operating the ballot carrier and actuating said registering mechanism through the medium of said ballot and means for restoring the ballot to normal condition after the registering mechanism has been operated and means for automatically restoring the last named means.

49. In combination, a registering mechanism, said registering mechanism comprising a series of banks of individual counters, a single counter frame carrying each bank of counters, a ballot carrier, a ballot connected thereto, means for operating the ballot carrier and actuating said registering mechanism through the medium of said ballot and means for restoring the ballot to normal condition after the registering mechanism has been operated and means for locking the ballot carrier after the registering mechanism has been operated, said means being controlled by the means which restore the ballot to normal condition.

50. In combination, a registering mechanism, said registering mechanism comprising a series of banks of individual counters, a single counter frame carrying each bank of counters, a ballot carrier, a ballot, means for operating the ballot carrier and actuating said registering mechanism through the medium of said ballot, and means for locking the ballot carrier immediately before said ballot is restored to normal condition.

51. In combination, a registering mechanism, said registering mechanism comprising a series of banks of individual counters, a series of counter frames, each counter frame carrying a bank of counters, a ballot carrier, a ballot, means for operating the ballot carrier and actuating the registering mechanism through the medium of the ballot, and means for locking the ballot carrier when the ballot is unconnected therewith.

52. In combination, a registering mechanism, said registering mechanism comprising a series of banks of individual counters, a single counter frame carrying each bank of counters, a ballot carrier, a ballot detachably connected to the ballot carrier, means for operating the ballot carrier and actuating said registering mechanism through the medium of the ballot, means for automatically locking the ballot carrier when the ballot is removed.

53. In combination, a registering mechanism, said registering mechanism comprising a series of banks of individual counters, a single counter frame carrying each bank of counters, a ballot carrier, a ballot detachably connected to the ballot carrier, means for operating the ballot carrier and actuating said registering mechanism through the medium of the ballot, means for automatically locking the ballot carrier when the ballot is removed and means for automatically unlocking the ballot carrier when the ballot is connected thereto.

54. In combination, a casing, registering mechanism carried thereby, said registering mechanism comprising a series of individual counters, a single counter frame carrying each bank of counters, a ballot carrier mounted therein, a ballot connected to the ballot carrier, movable tappets carried by the ballots, means for actuating the ballot carrier and operating the registering mechanism through the medium of said tappets and means for restoring said tappets to normal condition consisting of a tripping plate and means to automatically restore the tripping plate to normal position after the tappets have been tripped.

55. In combination, a casing, registering mechanism carried thereby, said registering mechanism comprising a series of individual counters, a single counter frame carrying each bank of counters, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a horizontal tripping plate and means to automatically restore the horizontal tripping plate to normal position after the tappets have been tripped.

56. In combination, a casing, registering mechanism carried thereby, said registering mechanism comprising a series of individual counters, a single counter frame carrying each bank of counters, a ballot carrier mounted therein, a ballot connected to the ballot carrier, movable tappets carried by the ballot, means for actuating the ballot carrier and operating mechanism through the medium of said tappets and means for restoring said tappets to normal condition consisting of a tripping plate and a slide provided with a bevel face which is movable against the edge of the tripping plate and a connection between the slide and the ballot carrier.

57. In combination, a casing, registering mechanism carried thereby, said registering mechanism comprising a series of individual counters, a single counter frame carrying each bank of counters, a ballot carrier mounted therein, a ballot connected to the ballot carrier, movable tappets carried by the ballot, means for actuating the ballot carrier and operating the registering mechanism through the medium of said tappets and means for restoring said tappets to normal condition consisting of a tripping plate and a slide provided with a bevel face which is movable against the edge of the tripping plate and a connection between the slide and the ballot carrier, and means for locking the tappet tripper when the ballot carrier is retracted.

58. In combination, a casing, a registering mechanism carried thereby, said registering mechanism comprising a series of individual counters, a single counter frame carrying each bank of counters, a ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip.

59. In combination, a casing, a registering mechanism carried thereby, said registering mechanism comprising a series of individual counters, a single counter frame carrying each bank of counters, a ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip and means for restoring said tappet tripper.

60. In combination, a casing, a registering mechanism carried thereby, said registering mechanism comprising a series of individual counters, a single counter frame carrying each bank of counters, a ballot carrier therein, a ballot connected with the ballot carrier, means for actuating the ballot carrier and operating the registering mechanism through the medium of the ballot, a tappet tripper, means for locking the tappet tripper, a notched plate and connections from the plate to the ballot carrier.

61. In combination, a casing, registering mechanism carried thereby, said registering mechanism comprising a series of individual counters, a single counter frame carrying each bank of counters, a ballot carrier mounted therein, a ballot connected to the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper and a connection between the slide and said tappet tripper lock.

62. In combination, a casing, registering mechanism carried thereby, said registering mechanism comprising a series of individual counters, a single counter frame carrying each bank of counters, a ballot carrier mounted therein, a ballot connected to the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper, said tappet tripper lock being provided with a slot and a pin carried by the slide and projecting through said slot.

63. In combination, a casing, registering mechanism therein, said registering mechanism comprising a series of individual counters, a single counter frame carrying each bank of counters, a ballot carrier, a ballot connected thereto, means for actuating said ballot carrier and operating the registering mechanism through the medium of the ballot, a tappet tripper, a tappet tripper lock comprising a notched plate, a slide slidably mounted on the tappet tripper lock, a pin on the slide projecting through the slot in the tappet tripper lock, a notched plate connected with the ballot carrier and engaging said pin, said slide having a bevel face adjacent the edge of the tappet tripper, a notched portion of said tappet tripper lock being movable by the edge of the tappet tripper and means carried by the tappet tripper lock and lying in the path of movement of means carried by the ballot carrier.

64. In combination, registering mechanism, said registering mechanism comprising a plurality of series of individual counters, a series of counter frames, each counter frame carrying each series of counters, a ballot carrier, a ballot holder mounted on the ballot carrier, a ballot and means for moving the ballot carrier and actuating said registers through the medium of said ballot.

65. In combination, a registering mechanism, said registering mechanism comprising a series of individual counters, a single counter frame carrying each bank of counters, a ballot carrier, a ballot holder mounted on the ballot carrier, a ballot and means for moving said ballot carrier and actuating the registering mechanism through the medium of said ballot, and means for lifting the ballot.

66. In combination, a casing, registering mechanism carried thereby, said registering mechanism comprising a series of individual counters, a single counter frame carrying each bank of counters, a ballot carrier mounted therein, a ballot holder mounted on the ballot carrier, a ballot connected with the carrier, means for operating the ballot carrier and actuating said registering mechanism through the medium of said ballot, a rock shaft, a lever carried by the rock shaft and under said ballot a hand lever carried by said shaft outside of said casing.

67. In combination, a casing, a registering mechanism carried thereby, said registering mechanism comprising a series of individual counters, a single counter frame carrying each bank of counters, a ballot carrier mounted therein, a ballot holder mounted on the ballot carrier, a ballot connected with the carrier, means for operating the ballot carrier and actuating said registering mechanism through the medium of said ballot, a rock shaft, a lever carried by the rock shaft, an antifriction roller carried on the end of said lever, and under said ballot a hand lever carried by said shaft outside of said casing.

68. In combination, a registering mechanism, said registering mechanism comprising a series of individual counters, a single counter frame carrying each bank of counters, a ballot carrier, a ballot holder mounted on the ballot carrier, a ballot connected thereto, means for operating the ballot carrier and actuating said registering mechanism through the medium of said ballot and means for restoring the ballot to normal condition after the registering mechanism has been operated.

69. In combination, a registering mechanism, said registering mechanism comprising a series of individual counters, a single counter frame carrying each bank of counters, a ballot carrier, a ballot holder mounted on the ballot carrier, a ballot connected thereto, means for operating the ballot carrier and actuating said registering mechanism through the medium of said ballot and means for restoring the ballot to normal condition after the registering mechanism has been operated and means for automatically restoring the last named means.

70. In combination, a registering mechanism, said registering mechanism comprising a series of individual counters, a single counter frame carrying each bank of counters, a ballot carrier, a ballot holder mounted on the ballot carrier, a ballot connected thereto, means for operating the ballot carrier and actuating said registering mechanism through the medium of said ballot and means for restoring the ballot to normal condition after the registering mechanism has been operated and means for locking the ballot carrier after the registering mechanism has been operated, said means being controlled by the means which restore the ballot to normal condition.

71. In combination, a registering mechanism, said registering mechanism comprising a series or banks of individual counters, a single counter frame carrying each bank of counters, a ballot carrier, a ballot holder mounted on the ballot carrier, a ballot, means for operating the ballot carrier and actuating said registering through the medium of said ballot, and means for locking the ballot carrier immediately before said ballot is restored to normal condition.

72. In combination, a registering mechanism, said registering mechanism comprising a series of individual counters, a single counter frame carrying each bank of counters, a ballot carrier, a ballot holder mounted on the ballot carrier, a ballot, means for operating the ballot carrier and actuating the registering mechanism through the medium of the ballot, and means for locking the ballot carrier when the ballot is unconnected therewith.

73. In combination, a registering mechanism, said registering mechanism comprising a series of individual counters, a single counter frame carrying each bank of counters, a ballot carrier, a ballot holder mounted on the ballot carrier, a ballot detachably connected to the ballot carrier, means for operating the ballot carrier and actuating said registering mechanism through the medium of the ballot, means for automatically locking the ballot carrier when the ballot is removed.

74. In combination, a registering mechanism, said registering mechanism comprising a series of individual counters, a single counter frame carrying each bank of counters, a ballot carrier, a ballot holder mounted on the ballot carrier, a ballot detachably connected to the ballot carrier, means for operating the ballot carrier and actuating said registering mechanism through the medium of the ballot, means for automatically locking the ballot carrier when the ballot is removed and means for automatically unlocking the ballot carrier when the ballot is connected thereto.

75. In combination, a casing, registering mechanism carried thereby, said registering mechanism comprising a series of individual counters, a single counter frame carrying each bank of counters, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a tripping plate and means to automatically restore the tripping plate to normal position after the tappets have been tripped.

76. In combination, a casing, registering mechanism carried thereby, said registering mechanism comprising a series of individual counters, a single counter frame carrying each bank of counters, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a horizontal tripping plate and means to automatically restore the horizontal tripping plate to normal position after the tappets have been tripped.

77. In combination, a casing, registering mechanism carried thereby, said registering mechanism comprising a series of individual counters, a single counter frame carrying each bank of counters, a ballot carrier mounted therein, a ballot holder mounted on the ballot carrier, a ballot connected to the ballot carrier, movable tappets carried by the ballot, means for actuating the ballot carrier and operating the registering mechanism through the medium of said tappets and means for restoring said tappets to normal condition consisting of a tripping plate, a slide provided with a bevel face which is movable against the edge of the tripping plate and a connection between the slide and the ballot carrier.

78. In combination, a casing, registering mechanism carried thereby, said registering mechanism comprising a series of individual counters, a single counter frame carrying each bank of counters, a ballot carrier mounted therein, a ballot holder mounted on the ballot carrier, a ballot connected to the ballot holder, movable tappets carried by the ballot, means for actuating the ballot holder and operating the registering mechanism through the medium of said tappets and means for restoring said tappets to normal condition consisting of a tripping plate, a slide provided with a bevel face which is movable against the edge of the tripping plate and a connection between the slide and the ballot carrier and means for locking the tappet tripper when the ballot carrier is retracted.

79. In combination, a casing, a registering mechanism carried thereby, said registering mechanism comprising a series of individual counters, a single counter frame carrying each bank of counters, a ballot carrier, a ballot holder mounted on the ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip.

80. In combination, a casing, a registering mechanism carried thereby, said registering mechanism comprising a series of individual counters, a single counter frame carrying each bank of counters, a ballot carrier, a ballot holder mounted on the ballot carrier, a ballot connected thereto, means for operating the ballot carrier and actuating said registering mechanism through the medium of said ballot, movable tappets carried by the ballot, a tappet tripper provided with perforations some of said tappets projecting through said perforations when the ballot carrier is in its forward position, and means for shifting said tappet tripper horizontally after the ballot has been moved a short distance on its return trip and means for restoring said tappet tripper.

81. In combination, a casing, a registering mechanism carried thereby, said registering mechanism comprising a series of individual counters, a single counter frame carrying each bank of counters, a ballot carrier therein, a ballot holder mounted on the ballot carrier, a ballot connected with the ballot carrier, means for actuating the ballot carrier and operating the registering mechanism through the medium of the ballot, a tappet tripper, means for locking the tappet tripper, a notched plate and connections from the plate to the ballot carrier.

82. In combination, a casing, registering mechanism carried thereby, said registering mechanism comprising a series of individual counters, a single counter frame carrying each bank of counters, a ballot carrier mounted therein, a ballot connected to the ballot carrier, a ballot holder mounted on the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper and a connection between the slide and said tappet tripper lock.

83. In combination, a casing, registering mechanism carried thereby, said registering mechanism comprising a series of individual counters, a single counter frame carrying each bank of counters, a ballot carrier mounted therein, a ballot connected to the ballot carrier, a ballot holder mounted on the ballot carrier, means for actuating the ballot carrier and operating the registers through the medium of the ballot, a tappet tripper, a tappet tripper lock comprising a notched plate, means on the notched plate lying in the path of movement of the means carried by the ballot holder, and a slide mounted adjacent the tappet tripper lock, said slide having a bevel face which is movable against the edge of the tappet tripper, said tappet tripper lock being provided with a slot and a pin carried by the slide and projecting through said slot.

84. In combination, a casing, registering mechanism therein, said registering mechanism comprising a series of individual counters, a single counter frame carrying each bank of counters, a ballot carrier, a ballot connected thereto, a ballot holder mounted on the ballot carrier, means for actuating said ballot carrier and operating the registering mechanism through the medium of the ballot, a tappet tripper, a tappet tripper lock comprising a notched plate, a slide slidably mounted on the tappet tripper lock, a pin on the slide projecting through the slot in the tappet tripper lock, a notched plate connected with the ballot carrier and engaging said pin, said slide having a bevel face adjacent the edge of the tappet tripper, a notched portion of said tappet tripper lock being movable by the edge of the tappet tripper and means carried by the tappet tripper lock and lying in the path of movement of means carried by the ballot carrier.

85. In combination, a casing, a registering mechanism, a ballot carrier, a ballot holder, a ballot connected thereto, means for actuating the ballot carrier and operating the registering mechanism through the medium of the ballot, a tappet tripper, a tappet tripper lock, means for locking said tappet tripper lock, and means carried by the ballot carrier for controlling said last named means.

86. In a retractor, a plate provided with a series of rows of perforations, a frame slidably mounted therein, a series of strips on said frame said strips having notches which are smaller than the perforations of said plate and which registers with the perforations in said plate when the frame is in normal position.

87. In a vote registering machine, a retractor, a series of posts projecting from the retractor, a tappet tripper comprising a plate provided with several rows of elongated perforations, said tappet tripper being also provided with an elongated slot in each corner thereof, the respective posts of the retractor projecting through the respective slots of the tappet tripper and a handle connected to the tappet tripper.

88. In a vote registering machine, a retractor, a series of posts projecting from the retractor, a tappet tripper comprising a plate provided with several rows of elongated perforations, said tappet tripper being also provided with an elongated slot in each corner thereof, the respective posts of the retractor projecting through the respective slots of the tappet tripper.

89. In a vote registering machine, registering mechanism, a ballot carrier, a ballot connected to the ballot carrier, a tripping plate, means for preventing the forward movement of the ballot holder after the ballot has been retracted from the registering mechanism, and means carried by the tappet tripper for controlling said last means.

90. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot and a detent engaging a ballot as soon as the ballot is retracted and means carried by the tripping plate for depressing said detent.

91. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot, and an offset carried on the end of said detent, said offset having a bevel face and a pin projecting from the tappet tripper and bearing against said offset.

92. In a vote registering machine, registering mechanism, a ballot carrier, a ballot holder connected thereto, a ballot carried by the ballot holder, means for operating the ballot carrier, advancing the ballot and actuating the registering mechanism through the medium of the ballot, means for locking the ballot holder after the same has been retracted and means for unlocking said ballot holder when a ballot is inserted into the holder.

93. In a vote registering machine, registering mechanism, a ballot carrier, a ballot holder connected thereto, a ballot carried by the ballot holder, a spring pressed detent provided with a bevel upper face and a projecting toe, a pivoted flat plate resting normally upon the upper corner of the detent, said flat plate passing through a slot in the lower part of the ballot holder and being in the path of movement of the ballot to be inserted into the ballot holder.

94. In combination, registering mechanism, a ballot carrier, a ballot holder connected to the ballot carrier, a ballot, means for operating a ballot carrier and actuating the registering mechanism through the medium of the ballot, and means to lock the ballot carrier and holder from movement when the ballot and holder are retracted, said means being controlled by the ballot so that when the ballot is removed said locking means is in locked position.

95. In combination, registering mechanism, a ballot carrier, a ballot holder connected thereto, a ballot, means to operate the ballot carrier advancing the ballot and operating the registering mechanism through the medium of the ballot, means to lock the ballot holder when retracted before the ballot is removed, said means unlocking the ballot holder when the ballot is removed and additional means for locking the ballot holder when retracted and when the ballot is removed both of said locking means being unlocked from the ballot holder when another ballot is inserted.

96. In combination, registering mechanism, a ballot carrier, a ballot holder connected thereto, a ballot, means for operating the ballot carrier advancing the ballot and registering mechanism, a tappet tripper, means for locking the tappet tripper during the forward movement of the ballot, means for locking the tappet tripper during the forward and return movement of the ballot carrier, means for unlocking the tappet tripper during the return movement of the ballot carrier when the ballot is slightly removed from the registering mechanism, means for automatically restoring the tappet tripper after it has been operated, means for locking the ballot holder when the same is retracted until the ballot is removed, means for locking the ballot holder in its retracted position while the ballot is removed and until a new ballot is inserted.

97. In combination, a casing, a registering mechanism, a retractor, a ballot carrier, a ballot holder connected thereto, a ballot carried by the ballot holder, and detachable therefrom and adapted to be prepared in secret in a booth before being placed in the ballot holder, means for operating the ballot carrier, advancing the ballot, actuating the registering mechanism, and retracting the retractor.

98. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor and means for locking said retractor.

99. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor, the means for retracting the retractor comprising pivoted arms, said arms having parallel inclined slots, studs on the ballot holder projecting through the slots, arms on the levers provided with toes which toes bear against the retractor.

100. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot and a detent engaging a ballot as soon as the ballot is retracted and means carried by the tripping plate for depressing said detent, a shaft, a pair of eccentric cams mounted on the shaft said cams engaging the ballot carrier for operating the same and advancing the ballot actuating the registering mechanism through the medium of the ballot.

101. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot, and an offset carried on the end of said detent, said offset having a bevel face and a pin projecting from the tappet tripper and bearing against said offset, a shaft, a pair of eccentric cams mounted on the shaft, said cams engaging the ballot carrier for operating the same and advancing the ballot actuating the registering mechanism through the medium of the ballot.

102. In a vote registering machine, registering mechanism, a ballot carrier, a ballot holder connected thereto, a ballot carried by the ballot holder, means for operating the ballot carrier, advancing the ballot and actuating the registering mechanism through the medium of the ballot, means for locking the ballot holder after the same has been retracted and means for unlocking said ballot holder when a ballot is inserted into the holder, a shaft, a pair of eccentric cams mounted on the shaft, said cams engaging the ballot carrier for operating the same and advancing the ballot actuating the registering mechanism through the medium of the ballot.

103. In a vote registering machine, registering mechanism, a ballot carrier, a ballot holder connected thereto, a ballot carried by the ballot holder, a spring pressed detent provided with a bevel upper face and a projecting toe, a pivoted flat plate resting normally upon the upper corner of the detent, said flat plate passing through a slot in the lower part of the ballot holder and being in the path of movement of the ballot to be inserted into the ballot holder, a shaft, a pair of eccentric cams mounted on the shaft, said cams engaging the ballot carrier for operating the same and advancing the ballot actuating the registering mechanism through the medium of the ballot.

104. In combination, registering mechanism, a ballot carrier, a ballot holder connected to the ballot carrier, a ballot, means for operating a ballot carrier and actuating the registering mechanism through the medium of the ballot, and means to lock the ballot carrier and holder from movement when the ballot and holder are retracted, said means being controlled by the ballot so that when the ballot is removed, said locking means is in locked position.

105. In combination, registering mechanism, a ballot carrier, a ballot holder connected thereto, a ballot, means to operate the ballot carrier advancing the ballot and operating the registering mechanism through the medium of the ballot, means to lock the ballot holder when retracted before the ballot is removed, said means unlocking the ballot holder when the ballot is removed and additional means for locking the ballot holder when retracted and when the ballot is removed both of said locking means being unlocked from the ballot holder when another ballot is inserted, a shaft, a pair of eccentric cams mounted on the shaft, said cams engaging the ballot carrier for operating the same and advancing the ballot actuating the registering mechanism through the medium of the ballot.

106. In combination, registering mechanism, a ballot carrier, a ballot holder connected thereto, a ballot, means for operating the ballot carrier advancing the ballot and registering mechanism, a tappet tripper, means for locking the tappet tripper during the forward movement of the ballot, means for locking the tappet tripper during the forward and return movement of the ballot carrier, means for unlocking the tappet tripper during the return movement of the ballot carrier when the ballot is slightly removed from the registering mechanism, means for automatically restoring the tappet tripper after it has been operated, means for locking the ballot holder when the same is retracted until the ballot is removed means for locking the ballot holder in its retracted position while the ballot is removed and until a new ballot is inserted, a shaft, a pair of eccentric cams mounted on the shaft, said cams engaging the ballot carrier for operating the same and advancing the ballot actuating the registering mechanism through the medium of the ballot.

107. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor, a shaft, a pair of eccentric cams mounted on the shaft, said cams engaging the ballot carrier for operating the same and advancing the ballot actuating the registering mechanism through the medium of the ballot.

108. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor and means for locking said retractor, a shaft, a pair of eccentric cams mounted on the shaft, said cams engaging the ballot carrier for operating the same and advancing the ballot actuating the registering mechanism through the medium of the ballot.

109. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor, the means for retracting the retractor comprising pivoted arms, said arms having parallel inclined slots, studs on the ballot holder projecting through the slots, arms on the levers provided with toes which toes bear against the retractor, a shaft, a pair of eccentric cams mounted on the shaft, said cams engaging the ballot carrier for operating the same and advancing the ballot actuating the registering mechanism through the medium of the ballot.

110. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot and a detent engaging a ballot as soon as the ballot is retracted and means carried by the tripping plate for depressing said detent, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

111. In combination, registering mechanism, a ballot carrier, a ballot connected thereto, a tripping plate, means for operating the ballot carrier, advancing the ballot and actuating the registering mechanism through the medium of the ballot, means to retract the ballot carrier and ballot, and an offset carried on the end of said detent, said offset having a bevel face and a pin projecting from the tappet tripper and bearing against said offset, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

112. In a vote registering machine, registering mechanism, a ballot carrier, a ballot holder connected thereto, a ballot carried by the ballot holder, means for operating the ballot carrier, advancing the ballot and actuating the registering mechanism through the medium of the ballot, means for locking the ballot holder after the same has been retracted and means for unlocking said ballot holder when a ballot is inserted into the holder, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

113. In a vote registering machine, registering mechanism, a ballot carrier, a ballot holder connected thereto, a ballot carried by the ballot holder, a spring pressed detent provided with a bevel upper face and a projecting toe, a pivoted flat plate resting normally upon the upper corner of the detent, said flat plate passing through a slot in the lower part of the ballot holder and being in the path of movement of the ballot to be inserted into the ballot holder, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

114. In combination, registering mechanism, a ballot carrier, a ballot holder connected to the ballot carrier, a ballot, means for operating a ballot carrier and actuating the registering mechanism through the medium of the ballot, and means to lock the ballot carrier and holder from movement when the ballot and holder are retracted, said means being controlled by the ballot so that when the ballot is removed, said locking means is in locked position, a ratchet carried by the shaft and a pawl engaging said ratchet.

115. In combination, registering mechanism, a ballot carrier, a ballot holder connected thereto, a ballot, means to operate the ballot carrier advancing the ballot and operating the registering mechanism through the medium of the ballot, means to lock the ballot holder when retracted before the ballot is removed, said means unlocking the ballot holder when the ballot is removed and additional means for locking the ballot holder when retracted and when the ballot is removed both of said locking means being unlocked from the ballot holder when another ballot is inserted, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

116. In combination, registering mechanism, a ballot carrier, a ballot holder connected thereto, a ballot, means for operating the ballot carrier advancing the ballot and registering mechanism, a tappet tripper, means for locking the tappet tripper during the forward movement of the ballot, means for locking the tappet tripper during the forward and return movement of the ballot carrier, means for unlocking the tappet tripper during the return movement of the ballot carrier when the ballot is slightly removed from the registering mechanism, means for automatically restoring the tappet tripper after it has been operated, means for locking the ballot holder when the same is retracted until the ballot is removed means for locking the ballot holder in its retracted position while the ballot is removed and until a new ballot is inserted, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

117. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

118. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor and means for locking said retractor, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

119. In combination, a casing, a registering mechanism, a retractor, a ballot carrier, a ballot holder connected thereto, a ballot carried by the ballot holder, means for operating the ballot carrier, advancing the ballot, actuating the registering mechanism, and retracting the retractor, the means for retracting the retractor comprising pivoted arms, said arms having parallel inclined slots, studs on the ballot holder projecting through the slots, arms on the levers provided with toes which toes bear against the retractor, a shaft, a pair of eccentric cams mounted on the shaft, said cams engaging the ballot carrier for operating the same and advancing the ballot actuating the registering mechanism through the medium of the ballot, a ratchet carried by the shaft and a pawl engaging said ratchet.

120. In combination, registering mechanism, a ballot carrier, a ballot, means for moving the ballot carrier and actuating said registers through the medium of said ballot, a plurality of independent printing devices and means for operating said printing devices.

121. In combination, registering mechanism, a ballot carrier, a ballot, means for holding a plurality of cards on said ballot, printing devices, and means for moving the ballot carrier and actuating said registering mechanism and said printing device to print said cards through the medium of said ballot.

122. In combination, a frame, registering mechanism, a ballot carrier, a ballot, a plurality of printing devices carried by a strip, said strip being attached to said frame and means for moving the ballot carrier and actuating said registering mechanism and said printing devices through the medium of said ballot.

123. In combination, a frame, registering mechanism, a ballot carrier, a ballot, a strip connected to said frame, a plurality of printing devices carried by said strip, one of said printing devices embracing a type, means for projecting said type, means for inking said type, and means for moving the ballot carrier and actuating said registers and said printing devices through the medium of said ballot.

124. In combination, registering mechanism, a ballot carrier, a ballot, printing devices, means for moving the ballot carrier and actuating said registers and said printing devices through the medium of said ballot, one of said printing devices comprising a case, a type bar pivoted therein, a type carried by said type bar and a lever pivoted behind said type bar for actuating the same.

125. In combination, registering mechanism, a ballot carrier, a ballot, printing devices, means for moving the ballot carrier and actuating said registers and said printing devices through the medium of said ballot, one of said printing devices comprising a case, a type bar pivoted therein, and means for attaching the type to the type bar whereby the type may be turned, and a lever pivoted behind said type bar for actuating the same.

126. In combination, a ballot, means for detachably holding a card thereon, registering mechanism, means for operating said registering mechanism through the medium of said ballot, and means operated by the ballot for printing said card.

127. In combination, a ballot, means for detachably holding a plurality of cards thereon, registering mechanism, means for operating said registering mechanism through the medium of said ballot, and means operated by the ballot for printing said cards.

128. In combination, a ballot, means for detachably holding a card thereon, registering mechanism, means for operating said registering mechanism through the medium of said ballot, means operated by the ballot for printing said card, and means for automatically removing said card from the ballot after it has been printed.

In testimony whereof I have signed my name to this specification, in the presence of two subscribing witnesses, at Los Angeles, in the County of Los Angeles and State of California, this 31st day of March, 1903.

DAVID L. NEWCOMB.

Witnesses:
GEORGE T. HACKLEY,
JULIA TOWNSEND.